United States Patent
Parkvall et al.

(10) Patent No.: US 11,196,465 B2
(45) Date of Patent: Dec. 7, 2021

(54) WIRELESS DEVICE, A RADIO NODE, AND METHODS THEREIN

(71) Applicant: Telefonaktiebolaget LM Ericsson (publ), Stockholm (SE)

(72) Inventors: Stefan Parkvall, Bromma (SE); Håkan Andersson, Linköping (SE); Mattias Frenne, Uppsala (SE); Johan Furuskog, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 674 days.

(21) Appl. No.: 15/315,330

(22) PCT Filed: Jan. 15, 2015

(86) PCT No.: PCT/SE2015/050034
§ 371 (c)(1),
(2) Date: Nov. 30, 2016

(87) PCT Pub. No.: WO2016/114696
PCT Pub. Date: Jul. 21, 2016

(65) Prior Publication Data
US 2017/0201300 A1  Jul. 13, 2017

(51) Int. Cl.
*H04W 36/00* (2009.01)
*H04B 7/0456* (2017.01)
(Continued)

(52) U.S. Cl.
CPC ......... *H04B 7/0456* (2013.01); *H04L 5/0051* (2013.01); *H04W 28/0236* (2013.01);
(Continued)

(58) Field of Classification Search
CPC ......... H04W 72/0446; H04W 72/0406; H04W 72/042; H04W 72/0453; H04W 72/0413;
(Continued)

(56) References Cited

U.S. PATENT DOCUMENTS

| | | | | |
|---|---|---|---|---|
| 5,602,583 A | * | 2/1997 | Citta | H04L 25/03343 348/21 |
| 5,877,712 A | * | 3/1999 | Kim | G11B 20/1426 341/68 |
| 9,270,356 B2 | * | 2/2016 | Chung | H04B 7/0684 |
| 9,432,100 B2 | * | 8/2016 | Sun | H04B 7/0456 |

(Continued)

FOREIGN PATENT DOCUMENTS

| | | |
|---|---|---|
| CN | 101971550 A | 2/2011 |
| CN | 102714587 A | 10/2012 |

(Continued)

OTHER PUBLICATIONS

Li, Jingyu et al., "Codebook Design for Uniform Rectangular Arrays of Massive Antennas", 2013 IEEE 77th Vehicular Technology Conference (VTC Spring), Jun. 2-5, 2013, 1-5.

*Primary Examiner* — Khalid W Shaheed
(74) *Attorney, Agent, or Firm* — Murphy, Bilak & Homiller, PLLC

(57) ABSTRACT

A wireless device 108 and a method therein for assisting in precoder selection for wireless communication with a Radio Node (RN) 106, and a RN 106 for performing precoder selection for wireless communication with a wireless device 108. The wireless device is configured with a set of precoders. The wireless device determines a subset of precoders out of the set of precoders; and transmits, to the RN, at least one Sounding Reference Signal (SRS) precoded with a respective at least one precoder comprised in the subset. The RN receives, from the wireless device, at least one SRS precoded with a respective at least one precoder comprised in a subset of precoders; and transmits, to the wireless device, a signal indicative of a selected precoder to be used for a transmission to the RN, wherein the selected precoder is indirectly selected based on the received at least one SRS.

60 Claims, 10 Drawing Sheets

(51) Int. Cl.
*H04L 5/00* (2006.01)
*H04W 28/02* (2009.01)
*H04W 72/14* (2009.01)
*H04B 7/06* (2006.01)
*H04W 74/08* (2009.01)

(52) U.S. Cl.
CPC ....... *H04W 36/0005* (2013.01); *H04W 72/14* (2013.01); *H04B 7/0469* (2013.01); *H04B 7/0628* (2013.01); *H04W 74/0833* (2013.01)

(58) Field of Classification Search
CPC . H04W 24/10; H04W 72/1231; H04W 76/27; H04W 24/02; H04W 72/0466; H04W 72/048
See application file for complete search history.

(56) References Cited

U.S. PATENT DOCUMENTS

| | | | |
|---|---|---|---|
| 9,769,677 B2* | 9/2017 | Hsu | H04B 7/0478 |
| 2010/0195759 A1* | 8/2010 | Gaal | H04B 7/0617 |
| | | | 375/295 |
| 2013/0272263 A1* | 10/2013 | Pi | H04W 72/042 |
| | | | 370/330 |
| 2013/0322280 A1 | 12/2013 | Pi | |

FOREIGN PATENT DOCUMENTS

| | | |
|---|---|---|
| CN | 103370898 A | 10/2013 |
| EP | 2262307 A1 | 12/2010 |
| JP | 2010045729 A | 2/2010 |
| RU | 2536345 C2 | 12/2014 |

* cited by examiner

WIRELESS DEVICE, A RADIO NODE, AND METHODS THEREIN

TECHNICAL FIELD

Embodiments herein relate generally to a wireless device, a radio node and to methods therein. In particular they relate to precoder selection for wireless communication.

BACKGROUND

Communication devices such as terminals are also known as e.g. User Equipments (UE), mobile terminals, wireless devices, wireless terminals and/or mobile stations. Terminals are enabled to communicate wirelessly in a wireless communications network and/or cellular communication system, sometimes also referred to as a cellular radio system or cellular network. The communication may be performed e.g. between two terminals, between a terminal and a regular telephone and/or between a terminal and a server via a Radio Access Network (RAN) and possibly one or more core networks, comprised within the wireless communications network.

Terminals may further be referred to as mobile telephones, cellular telephones, laptops, or surf plates with wireless capability, just to mention some further examples. The terminals in the present context may be, for example, portable, pocket-storable, hand-held, computer-comprised, or vehicle-mounted mobile devices, enabled to communicate voice and/or data, via the RAN, with another entity, such as another terminal or a server.

The cellular communications network covers a geographical area which is divided into cell areas, wherein each cell area is served by a radio node such as a base station, e.g. a Radio Base Station (RBS), which sometimes may be referred to as e.g. "eNB", "eNodeB", "NodeB", "B node", or BTS (Base Transceiver Station), depending on the technology and terminology used. The base stations may be of different classes such as e.g. macro eNodeB, home eNodeB or pico base station, based on transmission power and thereby also cell size. A cell is the geographical area where radio coverage is provided by the base station at a base station site. One base station, situated at the base station site, may serve one or several cells. Further, each base station may support one or several communication technologies. The base stations or radio nodes communicate over the air interface operating on radio frequencies with the communication devices, also denoted wireless devices, within range of the base stations or radio nodes. In the context of this disclosure, the expression Downlink (DL) is used for the transmission path from the radio node, e.g. a base station, to the wireless device. The expression Uplink (UL) is used for the transmission path in the opposite direction i.e. from the wireless device to the radio node. The radio node may in some circumstances, e.g. in systems enabling device-to-device communications, also be another wireless device.

Antenna beamforming is a technique of shaping the transmit radiated energy pattern or the receive sensed energy pattern into beams by the use of an antenna element array. The antenna elements are typically closely spaced with for example respect to the wavelength, or equivalently to the carrier frequency used for the wireless communication, e.g. the radio communication. These beams may be used to concentrate the transmitted signal energy and/or received signal energy and/or steer it in specific directions. FIG. 1 depicts a classic example wherein a linear antenna array is used to steer the beam an angle ω off-axis compared to the orientation of the antenna array. In order for the waveforms from two antenna elements to superimpose constructively in that direction, the phase rotation difference of the two signals due to the path distance difference Δ must correspond to an integer multiple of 2π. This requirement leads to an expression for the phase angle or phase delay φ that is a function of a steering angle, an array element distance, and a wavelength.

FIG. 1 schematically illustrates basic beamforming using a one-dimensional linear array, wherein d is the array element distance, ω the desired beam steering angle, $$\varphi = \frac{2\pi d \cdot \sin(\omega)}{\lambda}$$

the required phase delay, and λ is the wavelength. Typically d~λ/2.

When used herein the term 'beam' is used to refer to a certain spatial transmit radiation pattern or spatial receive sensitivity pattern created by using a combination of multiple antenna elements and the corresponding complex-valued weights applied to the signal at each antenna element. Further, in this description, the transmit radiated energy pattern and the spatial transmit radiation pattern may also be referred to as a transmission pattern, and the receive sensed energy pattern and the spatial receive sensitivity pattern may also be referred to as a reception pattern.

One example of creating such patterns is the classical beamforming case with a linear array with equally spaced antenna elements as depicted in FIG. 1 but other examples exist as well. In the general case, each beam corresponds to a certain combination of complex-valued weights, also denoted complex antenna weights, used to transmit or receive a signal.

If there are N antenna elements, then a precoding weight vector, or beamforming vector, is obtained as the N complex-valued weights, one for each antenna element. A precoding weight vector is also simply referred to as a precoder. The set of possible precoders that may be used, e.g. the set of possible precoders defined in the system or in the standard specification, is sometimes referred to as the precoder codebook although the term beam or beam codebook may also be used. Furthermore, in the general case, there is no need for the antenna elements to be linearly arranged with λ/2 spacing as in FIG. 1.

In case of spatial multiplexing, multiple spatial streams or layers may be superimposed by transmitting a linear combination of the layers from each antenna element. The linear combination is given by a precoding matrix which is formed by a set of precoding weight vectors, also denoted precoding vectors, one vector per layer.

Uplink data transmissions are scheduled by the network in LTE as well as in many other standards. The network in that case instructs the wireless device to transmit in the uplink using a certain set of parameters, such as a modulation scheme, a coding rate, a set of time-frequency resources, and a transmit power, etc. In case of uplink beamforming, the beam direction, or precoding weight vector, to use is provided by the 20 network. Thus, the codebook is of finite size and the network may refer to a specific entry of N precoding weights in the precoding codebook.

The design of the precoder codebook is done assuming a certain antenna arrangement, for example the linear and equally spaced arrangement as schematically illustrated in FIG. 1 wherein also omni-directional and identical antenna elements may be assumed. Although such a codebook most likely is a good choice for the setup for which it is designed, it may not be a good choice for other arbitrary antenna arrangements. Hence, either the antenna arrangement for which the codebook is designed needs to be mandated in all wireless devices, e.g. UEs, which significantly restricts the freedom of implementation, or the codebook needs to be a compromise 30 between all relevant antenna arrangements, which may limit performance gain of using beamforming, or alternatively the number of precoder entries in the codebook becomes unmanageably large to support the large number of possible different antenna arrangements.

SUMMARY

As the state of the art requires the communication network, e.g. a radio node (RN), to have knowledge about the precoding codebook when scheduling uplink transmissions for a wireless device, the network has to have knowledge about the antenna arrangement of the wireless device or the antenna arrangement for which the codebook is designed needs to be mandated in all wireless devices which significantly restricts the freedom of implementation. Alternatively, and as mentioned above, the codebook is a compromise between all the possible antenna arrangements, which limits performance gain of using beamforming. Therefore, an object of embodiments herein is to provide a way of improving the performance in a wireless communications network, wherein the freedom of implementation and the performance gain of using beamforming are improved.

According to a first aspect of embodiments herein, the object is achieved by a method performed by a wireless device for assisting in precoder selection for wireless communication with a Radio Node (RN). The wireless device is configured with a set of precoders.

In the method, the wireless device determines a subset of precoders out of the set of precoders, and transmits, to the RN, at least one sounding reference signal precoded with a respective at least one precoder comprised in the subset.

According to a second aspect of embodiments herein, the object is achieved by a wireless device for assisting in precoder selection for wireless communication with a RN. The wireless device is configured with a set of precoders. The wireless device is configured to determine a subset of precoders out of the set of precoders, and to transmit, to the RN, at least one sounding reference signal precoded with a respective at least one precoder comprised in the subset.

According to a third aspect of embodiments herein, the object is achieved by a method performed by a wireless device for transmitting data to a RN. The wireless device is configured with a set of precoders, wherein each precoder in the set of precoders is defined to provide a respective transmission pattern when applied to transmission on a set of antenna elements of the wireless device.

In the method, the wireless device determines a subset of precoders out of the set of precoders.

Further, the wireless device transmits, to the RN, at least one sounding reference signal precoded with a respective at least one precoder comprised in the subset.

Furthermore, the wireless device receives, from the RN, a scheduling grant for transmitting data, which scheduling grant is based on the transmitted at least one sounding reference signal.

Yet further, the wireless device transmits data to the RN in accordance with the scheduling grant.

According to a fourth aspect of embodiments herein, the object is achieved by a wireless device for transmitting data to a RN. The wireless device is configured with a set of precoders, wherein each precoder in the set of precoders is defined to provide a respective transmission pattern when applied to transmission on a set of antenna elements of the wireless device.

The wireless device is configured to determine a subset of precoders out of the set of precoders.

Further, the wireless device is configured to transmit, to the RN, at least one sounding reference signal precoded with a respective at least one precoder comprised in the subset.

Furthermore, the wireless device is configured to receive, from the RN, a scheduling grant for transmitting data, which scheduling grant is based on the transmitted at least one sounding reference signal.

Yet further, the wireless device is configured to transmit data to the RN in accordance with the scheduling grant.

According to a fifth aspect of embodiments herein, the object is achieved by a method performed by a Radio Node (RN) for performing precoder selection for wireless communication with a wireless device. The wireless device is configured with a set of precoders.

In the method, the RN receives, from the wireless device, at least one sounding reference signal precoded with a respective at least one precoder comprised in a subset of precoders out of the set of precoders.

Further, the RN transmits, to the wireless device, a signal indicative of a selected precoder to be used for a transmission to the RN, wherein the selected precoder is indirectly selected based on the received at least one sounding reference signal.

According to a sixth aspect of embodiments herein, the object is achieved by a RN for performing precoder selection for wireless communication with a wireless device. The wireless device is configured with a set of precoders.

The RN is configured to receive, from the wireless device, at least one sounding reference signal precoded with a respective at least one precoder comprised in a subset of precoders out of the set of precoders.

Further, the RN is configured to transmit, to the wireless device, a signal indicative of a selected precoder to be used for a transmission to the RN, wherein the selected precoder is indirectly selected based on the received at least one sounding reference signal.

According to a seventh aspect of embodiments herein, the object is achieved by a method performed by a RN for receiving data from a wireless device. The wireless device is configured with a set of precoders.

In the method, the RN receives, from the wireless device, at least one sounding reference signal precoded with a respective at least one precoder comprised in a subset of precoders out of the set of precoders.

Further, the RN transmits, to the wireless device, a scheduling grant for transmitting data to the RN, which scheduling grant is based on a selected one of the received at least one sounding reference signal.

Furthermore, the RN receives data from the wireless device in accordance with the scheduling grant.

According to an eighth aspect of embodiments herein, the object is achieved by a RN for receiving data from a wireless device. The wireless device is configured with a set of precoders.

The RN is configured to receive, from the wireless device, at least one sounding reference signal precoded with a respective at least one precoder comprised in a subset of precoders out of the set of precoders.

Further, the RN is configured to transmit, to the wireless device, a scheduling grant for transmitting data to the RN, which scheduling grant is based on a selected one of the received at least one sounding reference signal.

Furthermore, the RN is configured to receive data from the wireless device in accordance with the scheduling grant.

According to a ninth aspect of embodiments herein, the object is achieved by a computer program, comprising instructions which, when executed on at least one processor, causes the at least one processor to carry out the method in the wireless device.

According to a tenth aspect of embodiments herein, the object is achieved by a computer program, comprising instructions which, when executed on at least one processor, causes the at least one processor to carry out the method in the RN.

According to an eleventh aspect of embodiments herein, the object is achieved by a carrier comprising the computer program, wherein the carrier is one of an electronic signal, an optical signal, a radio signal or a computer readable storage medium.

Since the wireless device determines a subset of precoders out of the set of precoders, and transmits, to the RN, at least one sounding reference signal precoded with a respective at least one precoder comprised in the subset, the RN does not need to have knowledge about the antenna arrangement of the wireless device or about the codebook whereby the freedom of implementation and the performance gain of using beamforming are enhanced. This results in an improved performance in the wireless communications network.

An advantage with embodiments herein is that uplink beamforming is possible without the wireless communications network, e.g. the RN, having knowledge about the actual antenna arrangement in the wireless device.

Another advantage with embodiments herein is that since the RN does not need to know, i.e. have detailed information on, the antenna arrangement in the wireless device, flexibility regarding the implementation, in particular of antenna arrangements, in wireless devices is provided and the need for having a codebook optimized with a specific antenna arrangement in mind is avoided.

Yet another advantage with embodiments herein is that the RN does not need to sound all or a large number of the possible uplink beams but only a UE derived subset of them, i.e. a subset derived by the wireless device, whereby the overhead due to a large number of sounding reference signals is reduced. Thereby, the procedure to sound the relevant precoders will be faster.

BRIEF DESCRIPTION OF DRAWINGS

Examples of embodiments herein are described in more detail with reference to attached drawings in which.

DETAILED DESCRIPTION

Embodiments herein relate to precoder selection for wireless communication.

Below, embodiments herein will be illustrated in more detail by a number of exemplary embodiments. It should be noted that these embodiments are not mutually exclusive. Components from one embodiment may be tacitly assumed to be present in another embodiment and a person skilled in the art will realize how those components may be used in the other exemplary embodiments.

Figure 1:
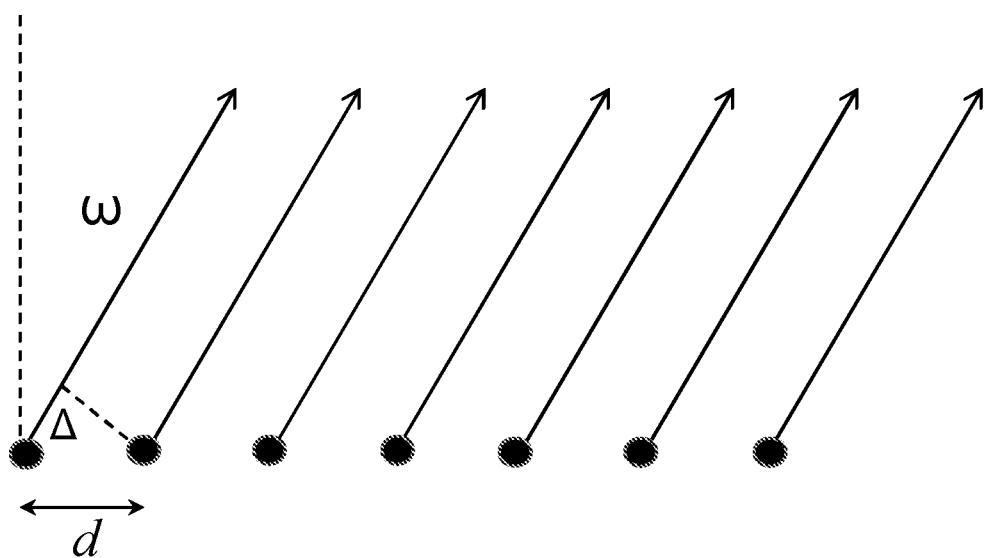
FIG. 1 schematically illustrates beam forming using a one-dimensional linear antenna array.
Figure 2:
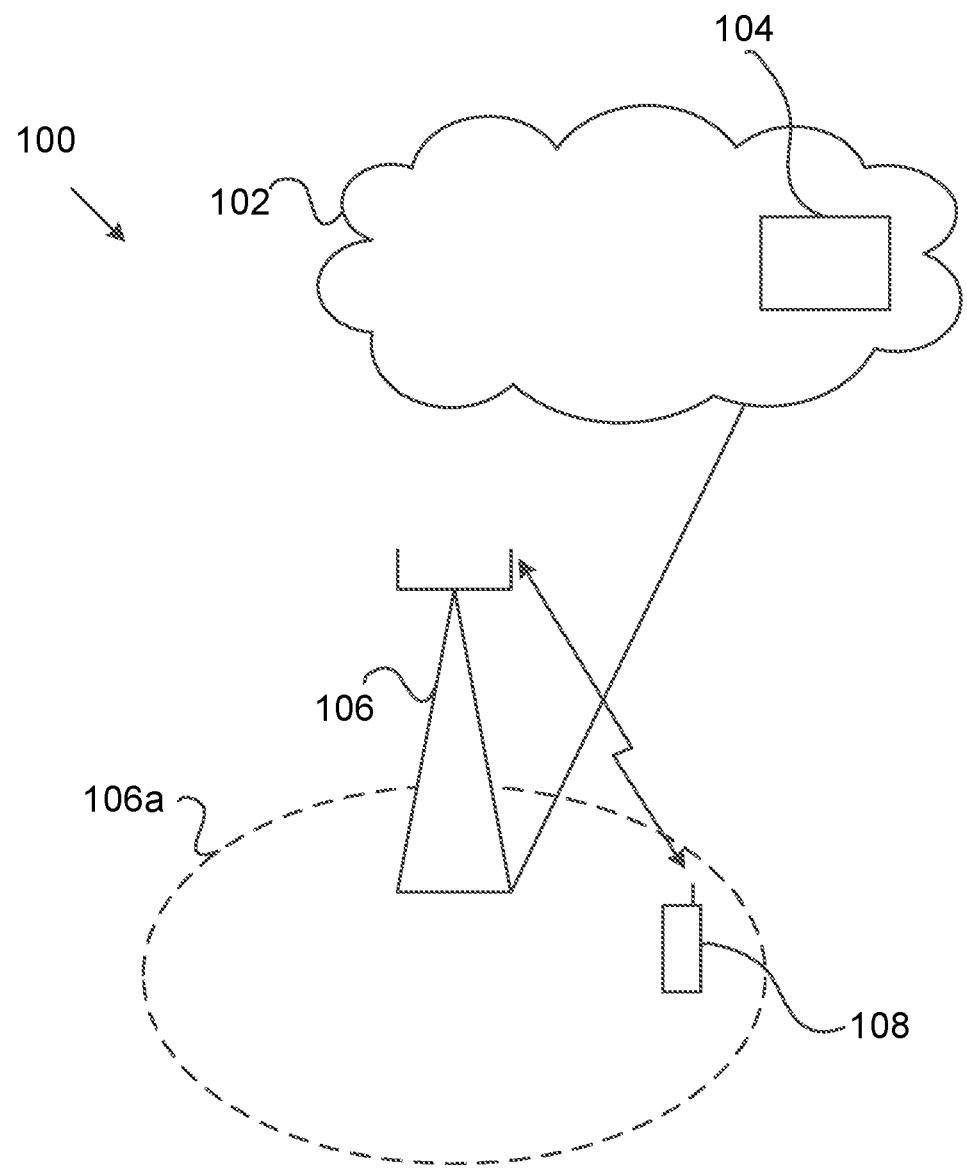
FIG. 2 schematically illustrates an embodiment of a communications network.

As schematically illustrated in FIG. 2 embodiments herein relate to a communications network 100, such as a wireless communications network or a cellular communications network. The communications network 100 may be an LTE network, a WCDMA network, an GSM network, any 3GPP cellular network, Wimax, or any other wireless communications network or system.

The communications network 100 may comprise a core network 102, such as an LTE Core network, e.g. a System Architecture Evolution (SAE) network, a WCDMA core network, an GSM core network, any 3GPP cellular core network, a Wimax core network, or any other wireless communications core network or system.

The communications network 100 may also comprise a core network node 104, such as an LTE core network node, a WCDMA core network node, an GSM core network node, any 3GPP cellular core network node, a Wimax core network node, or any other wireless communications core network or system node.

Further, the wireless communications network 100 comprises a Radio Node (RN) 106 for wireless communication with wireless devices, such as a wireless device 108, when they are located within a geographical area 106a served by the radio node 106.

The radio node 106 may be a transmission point such as a radio base station, for example an eNodeB, also denoted eNB, a Home eNodeB, or a NodeB or any other network node capable to serve a wireless device, e.g. a user equipment or a machine type communication device in a wireless communications network, such as the communications network 100. In case of device-to-device (D2D) communication, the RN 106 may be a wireless device. In such embodiments, the wireless device 108 may be referred to as a first wireless device and the RN 106 may be referred to as a second wireless device, or vice versa.

The wireless device, e.g. the wireless device 108, herein also referred to as a user equipment or UE, operates in the wireless communications network 100. The wireless device may e.g. be a user equipment, a mobile terminal or a wireless terminal, a mobile phone, a computer such as e.g. a laptop, a Personal Digital Assistant (PDA) or a tablet computer, sometimes referred to as a surf plate, with wireless capability, or any other radio network unit capable of communicating over a radio link in the wireless communications network 100. Please note that the term user equipment used in this document also covers other wireless devices such as Machine-to-Machine (M2M) devices, even though they may not have any user.

According to some embodiments herein, the wireless device 108 is configured with a set M of precoders, which set may have a size Ω, sometimes also referred to as |M|. In other words, the set may comprise Ω precoders. The precoders may sometimes be referred to as potential precoders, as will be explained herein. Each precoder may in some embodiments have a length N, whereas in other embodiments, N is an upper limit for the length of the precoders. N is also the number of antenna elements, e.g. controllable antenna elements, based on the antenna configuration applicable for the wireless device 108. Each precoder may correspond to different beam directions and/or polarization states. Hence, the set of precoders or beams may be defined in, or specific to, the implementation of the wireless device 108. The quantity N may be seen as an upper limit of the actual number of physical antenna elements participating in a transmission or a reception since different precoders may comprise zero valued entries, i.e. the precoding weight for one or more antenna elements may be set to zero for some precoders in the set of precoders. Hence only subsets of the available antenna elements may be used in some cases which is up to the implementation of the wireless device 108. A precoder that selects subsets of antenna elements may e.g., be implemented using an analog antenna switch.

The wireless device 108 further defines or determines a subset of these precoders, e.g. beam directions, and uplink data transmissions may be scheduled only within the defined or determined subset. The subset of precoders, or beam directions, may be derived autonomously in the wireless device 108. For example, the subset may be based on downlink measurements and may utilize the reciprocity, e.g. the long-term reciprocity, for example regarding direction of arrival of transmissions, between the uplink and the downlink. A Radio Node (RN) 106, e.g. an eNodeB (eNB), or a second wireless device in case of D2D communication, may then configure the wireless device 108 to transmit one or more, or in some embodiments more than one, sounding reference signals weighted by different precoders, i.e. in different beams or beam directions, in the determined subset to further determine upon which beam(s) to schedule uplink data transmissions.

An advantage of embodiments herein is that the RN 106 does not need to know, i.e. have detailed information on, the antenna arrangement in the wireless device 108 which allows for more implementation flexibility in the wireless device 108, in particular regarding the antenna arrangement in the wireless device 108, and avoids need for specifying a codebook optimized with a specific antenna arrangement in mind. Still the RN 106 may obtain uplink channel measurements of the most relevant beams from the wireless device 108.

Figure 3:
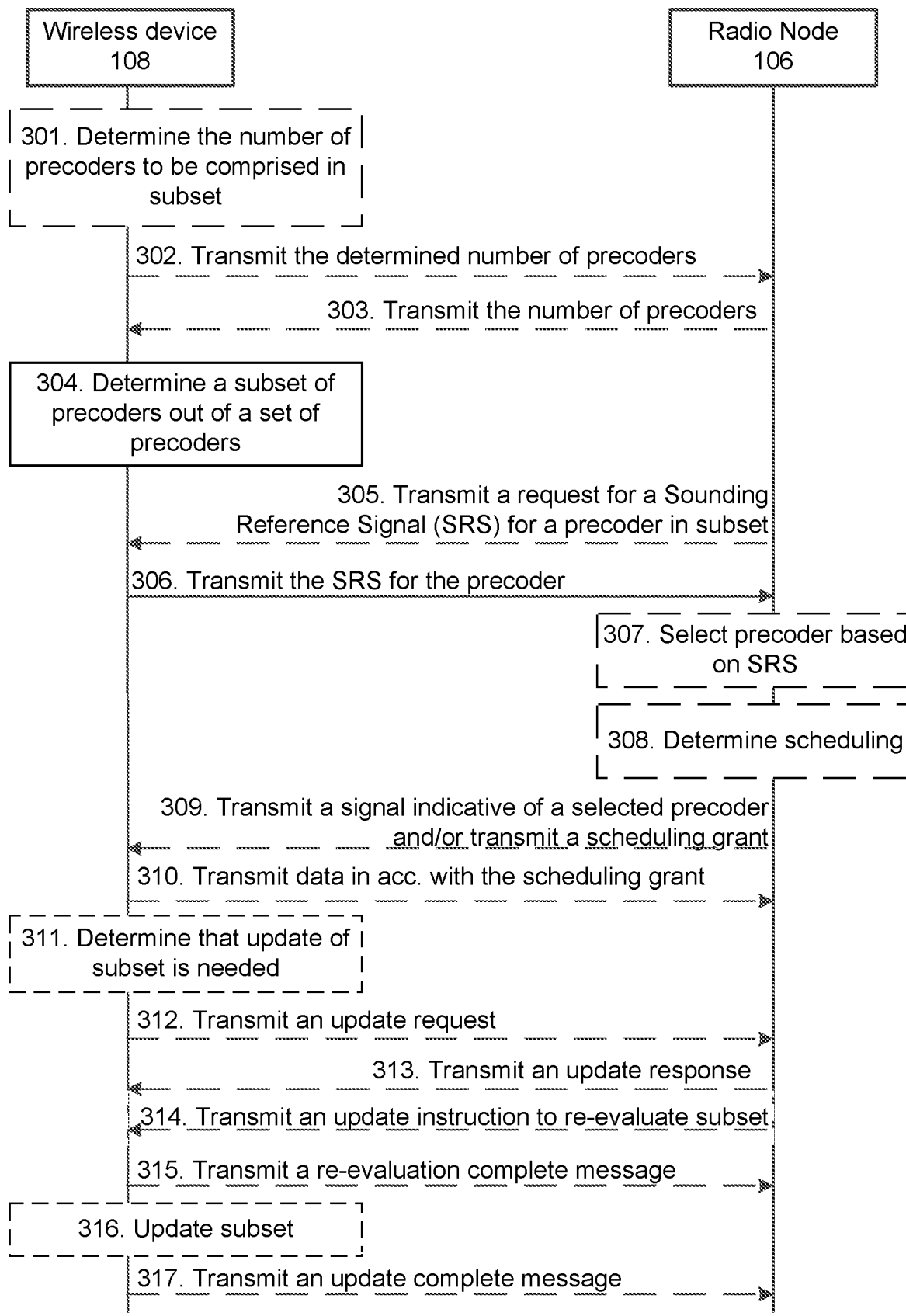
FIG. 3 is a schematic combined flowchart and signalling scheme of embodiments of a communications network.

A method in the communications network 100 for performing precoder selection for wireless communication between the wireless device 108 and the RN 106 will now be described with reference to a combined flowchart and signalling scheme depicted in FIG. 3. The wireless device 108 is configured with a set of precoders.

Further and in accordance with some embodiments, a method in the communications network 100 for transmitting data from the wireless device 108 to the RN 106 and for receiving the data at the RN 106 will also be described with reference to the combined flowchart and signalling scheme depicted in FIG. 3. As mentioned above, the wireless device 108 is configured with a set of precoders. Each precoder in the set of precoders may be defined to provide a respective transmission pattern when applied to transmission on a set of antenna elements of the wireless device 108.

The methods comprise one or more of the following actions. It should be understood that actions may be taken in any suitable order and that actions may be combined.

Action 301

In some embodiments, the wireless device 108 determines a number of precoders to be comprised in a subset of precoders. The wireless device 108 may perform this in order to limit the number of potential precoders to be comprised in the subset. By the expression "potential precoders" is meant precoders that are available for selection and transmission.

Each precoder may comprise a set of precoding weights, wherein each precoding weight may correspond to at least one antenna element of the wireless device 108.

Action 301 relates to Action 401 which will be described below.

Action 302

In some embodiments, wherein the wireless device 108 has determined the number of precoders to be comprised in the subset as mentioned in Action 301 above, the wireless device 108 may transmit the determined number or information relating to the determined number of precoders to the RN 106. This may be done to inform the RN 106 about the size of the subset. However, it should be understood that the RN 106 does not need to know the exact size of the subset, i.e. the exact number of precoders to be comprised in the subset. In some embodiments, the wireless device 108 transmits information relating to an upper limit of the size of the subset.

In some embodiments, Action 302 is performed after Action 304 described below. In such embodiments, the wireless device 108 determines the subset of precoders out of the set of precoders, and thereafter transmits the determined number or information relating to the determined number of precoders to the RN 106. If for example, the subset comprises five precoders the wireless device 108 may transmit, to the RN 106, the number five or information relating to the five precoders, e.g. a respective index for each precoder. However, if the subset comprises five precoders but only three of them are unique, the wireless device 108 may transmit only information relating to the three unique precoders.

Action 302 relates to Action 402 which will be described below.

Action 303

In some alternative embodiments, the RN 106 transmits the number of precoders to be comprised in the subset to the wireless device 108. Thus, in such embodiments, the wireless device 108 receives the number of precoders to be comprised in the subset from the RN 106 instead of determining the number itself. In other embodiments, the RN 106 may transmit information relating to the number of precoders, e.g. a respective index for each precoder, from which information the wireless device 108 may then derive the number of precoders to be comprised in the subset.

Action 303 relates to Actions 403 and 601 which will be described below.

Action 304

The wireless device 108 determines the subset of precoders out of the set of precoders. The wireless device 108 may in some embodiments determine the subset in response to the reception of the number of precoders to be comprised in the subset transmitted from the RN 106 or upon reception of information relating to the number of precoders to be comprised in the subset transmitted from the RN 106.

Further, as previously mentioned, the wireless device 108 may in further embodiments determine the subset of precoders autonomously based on e.g. downlink measurements and utilization of reciprocity, e.g. the long-term reciprocity, for example regarding direction of arrival of transmissions, between the uplink and the downlink.

Furthermore, the precoders may be numbered to have a consecutive order or each precoder may be assigned a respective index. The indices may be assigned by the wireless device 108. As mentioned above, the wireless device may in some embodiments receive a set of indices from the RN 106 to be assigned to the precoders in the subset.

Action 304 relates to Action 404 which will be described below.

Action 305

In some embodiments, the RN 106 transmits a request, to the wireless device 108, for transmission of at least one Sounding Reference Signal (SRS). The RN 106 may request transmission of the at least one SRS in order to assess the channel quality using the different corresponding precoders used for precoding the different SRSs of the transmitted at least one SRS. The at least one SRS may in some embodiments comprise more than one SRS. In other words, the at least one SRS may in some embodiments comprise a plurality of sounding reference signals.

Action 305 relates to Actions 405 and 603 which will be described below.

Action 306

The wireless device 108 transmits, to the RN 106, at least one SRS precoded with a respective at least one precoder comprised in the subset. The wireless device 108 may transmit the at least one SRS in response to the request mentioned in Action 305 above. In some embodiments, where the at least one SRS comprises more than one SRS, each of the more than one SRSs is precoded with a respective one of more than one precoders comprised in the subset. In other words, in such embodiments, each one of the plurality of sounding reference signals is precoded with a respective one of a plurality of precoders comprised in the subset.

Action 306 relates to Actions 406 and 604 which will be described below.

Action 307

The RN 106 may select a precoder comprised in the subset based on the received at least one SRS. The precoder may be indirectly or implicitly selected by the RN 106 selecting the SRS that was precoded with the selected precoder by the wireless device 108.

Action 307 relates to Action 605 which will be described below.

Action 308

In some embodiments, the RN 106 determines a scheduling of a transmission from the wireless device 108 to the RN 106, which scheduling may comprise information on the selected precoder or may be based on information relating to the selected precoder.

Action 309

In order to inform the wireless device 108 about the precoder to be used for a transmission to the RN 106, the RN 106 may transmit a signal indicative of a selected precoder to be used for the transmission to the RN 106, which signal is received by the wireless device 108. In some embodiments, the RN 106 may additionally or alternatively transmit, to the wireless device 108, a scheduling grant which scheduling grant is based on the selected precoder. The selected precoder may be indirectly selected based on the received at least one SRS. The at least one SRS may in some embodiments comprise more than one SRS, i.e. a plurality of sounding reference signals. The signal indicative of the selected precoder may in some embodiments comprise the scheduling grant. In such embodiments, the signal may be seen as indicative of the selected precoder at least in that the scheduling grant is based on the SRS that was precoded with the selected precoder by the wireless device 108. The signal may also be indicative of the selected precoder by carrying other information, such as an index of the selected precoder or a number related to the order by which the SRSs were transmitted by the wireless device 108 and received by the RN 106, so that the order number of the SRS indicates the selected precoder to the wireless device 108.

Action 309 relates to Actions 407 and 606 which will be described below.

Action 310

In some embodiments, the wireless device 108 transmits data to the RN 106 in accordance with the received scheduling grant. Thus, the wireless device 108 transmits data to the RN 106 using the selected precoder. Action 310 relates to Actions 408 and 607 which will be described below.

Action 311

In some embodiments, when the wireless device 108 and the RN 106 have moved in relation to each other or when the radio propagation environment has been changed, the wireless device 108 may determine that an update of the subset of precoders is needed.

Action 311 relates to Action 409 which will be described below.

Action 312

In some embodiments, wherein the wireless device 108 has determined that an update of the subset is needed as described in Action 311, the wireless device 108 may transmit an update request for updating the subset of precoders to the RN 106. This may be done in order to inform the RN 106 about the update or to receive a permission or an instruction from the RN 106 to perform the update. This will be described in more detail in Action 410 below.

Action 312 relates to Actions 409, 410, and 608 which will be described below.

Action 313

In response to receiving the update request transmitted from the wireless device 108 as mentioned in Action 312 above, the RN 106 may transmit an update response. In some embodiments, the update response comprises a permission or an instruction for the wireless device 108 to perform the update.

Action 313 relates to Actions 411 and 609 which will be described below.

Action 314

In some embodiments, as an alternative to at least one of Actions 311, 312 and 313, the RN 106 may transmit, to the wireless device 108, an update instruction instructing the wireless device 108 to re-evaluate the subset of precoders. For example, this may be done when the RN 106 has determined that the wireless device 108 and the RN 106 have moved in relation to each other or that the radio propagation environment has been changed.

Action 314 relates to Actions 409 and 610 which will be described below.

Action 315

In response to receiving the update instruction from the RN 106, the wireless device 108 may re-evaluate the subset of precoders to determine whether or not the subset needs to be updated. Further, the wireless device 108 may transmit a re-evaluation complete message to the RN 106 when the re-evaluation has been completed.

Action 315 relates to Actions 409, 610 and 611 which will be described below.

Action 316

In some embodiments, the wireless device 108 updates the subset of precoders. The subset of precoders may in an embodiment where Action 315 is performed, be updated by the wireless device 108 based on the re-evaluation of the subset of precoders.

Action 316 relates to Action 412 which will be described below.

Action 317

The wireless device 108 may indicate to the RN 106 that the subset of precoders have been updated. In some embodiments, the wireless device 108 transmits an update complete message to the RN 106 when the update of the subset is completed, whereby the RN 106 is informed about the update.

Action 317 relates to Actions 412 and 611 which will be described below.

Method performed in a wireless device 108 for assisting in precoder selection for wireless communication with the RN 106, will now be described with reference to flow charts depicted in FIG. 4a-4c. The wireless device 108 is configured with a set of precoders.

Further and in accordance with some embodiments, methods performed in the—wireless device 108 for transmitting data to the RN 106 will also be described with reference to the flow charts depicted in FIG. 4a-4c. The wireless device 108 is configured with a set of precoders. Each precoder in the set of precoders may be defined to provide a respective transmission pattern when applied to transmission on a set of antenna elements of the wireless device 108.

The methods comprise one or more of the following actions. It should be understood that actions may be taken in any suitable order and that actions may be combined.

Action 401

Figure 4A:
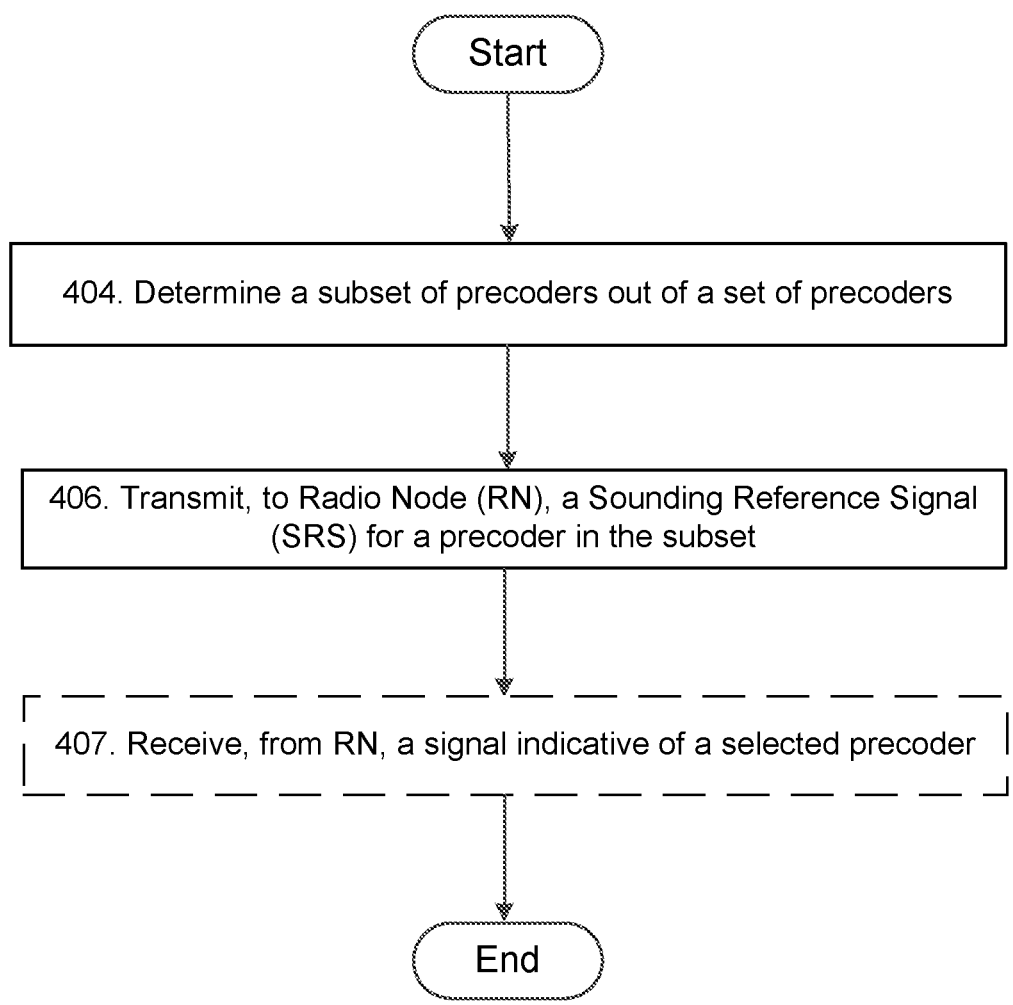
FIG. 4a is a flowchart depicting embodiments of a method in a wireless device.
Figure 4B:
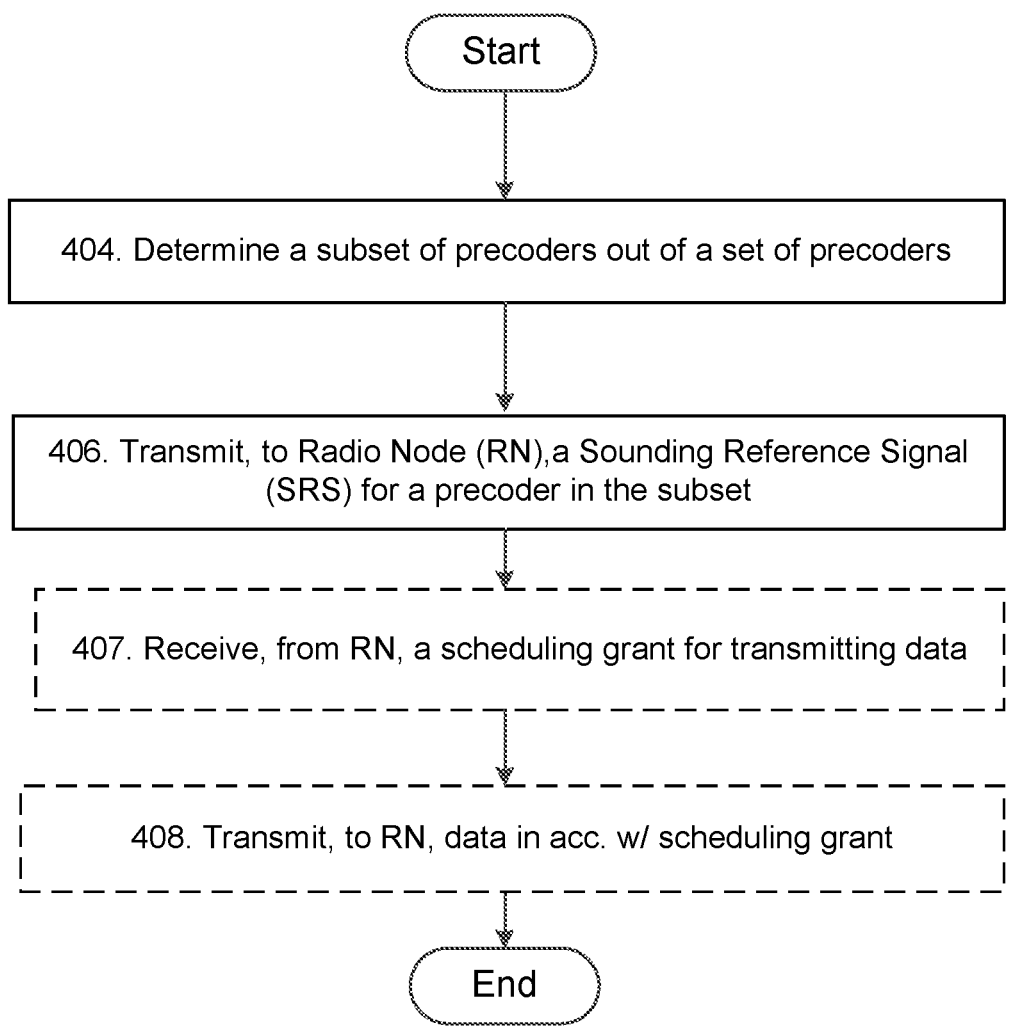
FIG. 4b is a flowchart depicting embodiments of a method in a wireless device.
Figure 4C:
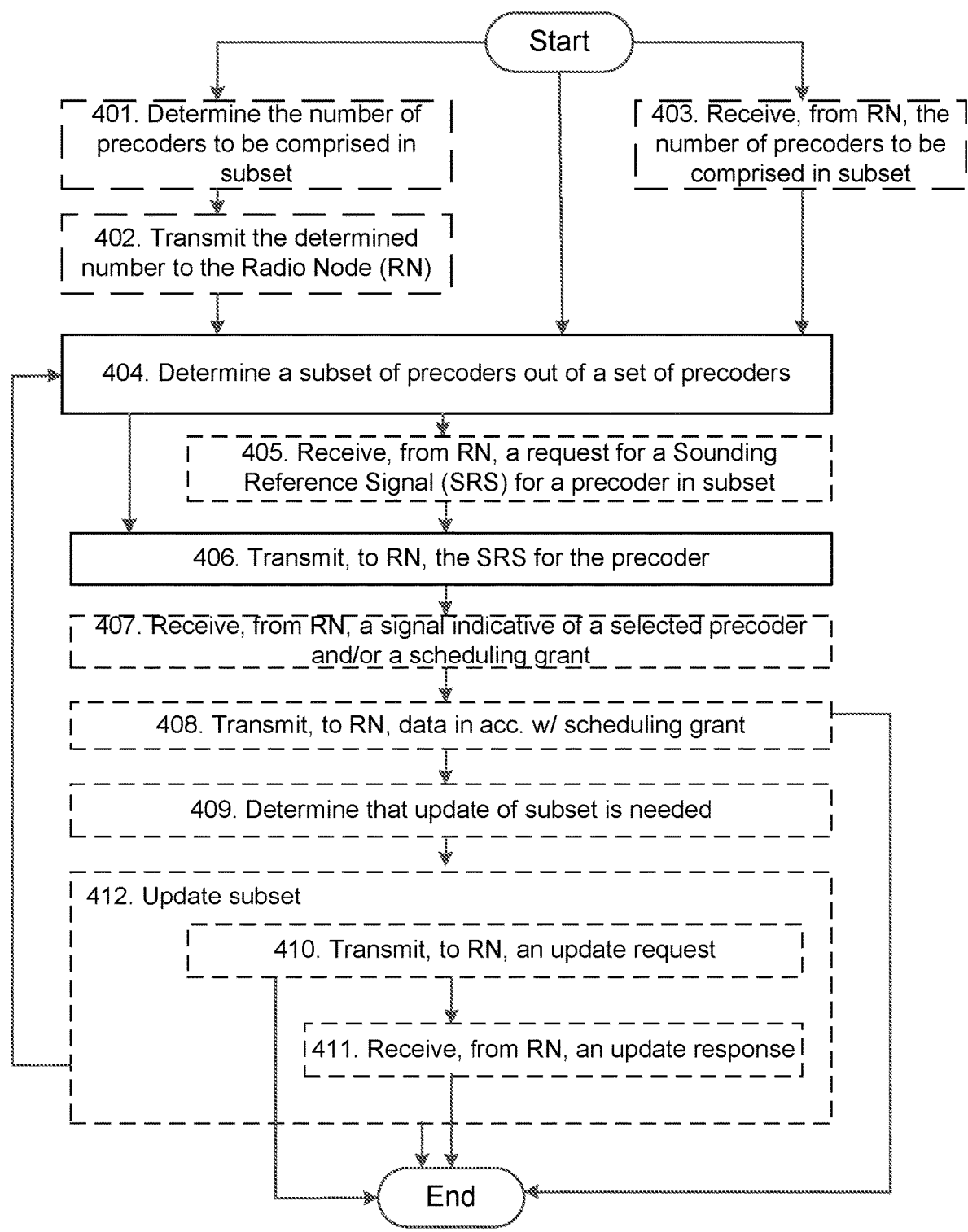
FIG. 4c is a flowchart depicting embodiments of a method in a wireless device.

In some embodiments, cf. e.g. FIG. 4c, the wireless device 108 determines a number of precoders to be comprised in the subset. As previously mentioned, the wireless device 108 may perform this in order to limit the number of potential precoders to be comprised in the subset.

Action 402

When the wireless device 108 has determined the number of precoders as mentioned in Action 401 above, the wireless device 108 may transmit, to the RN 106, information about the determined number of precoders. The information about the determined number of precoders may in some embodiments be the determined number. In other embodiments, the information about the number of precoders may for example be a set of indices assigned to the precoders in the subset as described above in relation to Action 303. Thus, the wireless device 108 may transmit information about the determined number of precoders to the RN 106 in order to inform the RN 106 about the size of the subset of precoders.

The wireless device 108 may transmit the information about the determined number in several ways. For example the wireless device 108 may transmit the information about the number in a Media Access Control (MAC) information element, in an Radio Resource Control (RRC) message, and/or by Layer 1 (L1) and/or Layer 2 (L2) signalling, for example explicit L1 signalling, and/or L1/L2 control signalling, etc.

Action 402 relates to Action 602 which will be described below.

Action 403

In some embodiments, cf. e.g. FIG. 4c, the wireless device 108 may as an alternative to Action 402, receive, from the RN 106, information about the number of precoders to be comprised in the subset.

The wireless device 108 may receive the information about the number in several ways. For example the wireless device 108 may receive the information about the number in a MAC information element, in an RRC message, and/or by L1 and/or L2 signalling, for example explicit L1 signalling, and/or L1/L2 control signalling, etc.

Action 403 relates to Action 601 which will be described below.

Action 404

The wireless device 108 determines a subset of precoders out of the set of precoders, cf. e.g. FIGS. 4a-4c.

The wireless device 108 may determine the subset of precoders based on a measurement on at least one transmission from the RN 106 to the wireless device 108.

The wireless device 108 determining the subset may comprise the wireless device 108 receiving at least one transmission from the RN 106 and determining the subset to comprise at least one precoder, which at least one precoder gives substantially the same transmit radiated energy pattern as the receive sensed energy pattern of the received at least one transmission, i.e. to comprise at least one precoder, which at least one precoder gives a transmit radiated energy pattern that is substantially equal to a receive sensed energy pattern of the received at least one transmission. In other words, the at least one precoder gives an antenna transmission pattern that corresponds to an antenna reception pattern of the received at least one transmission.

The wireless device 108 may further determine the subset based on knowledge about at least one preceding subset or based on a random-access procedure. For example, the wireless device 108 may determine that the subset should comprise the at least one preceding subset or a part thereof. Further, the wireless device 108 may determine the subset based on a random-access procedure wherein the wireless device 108 has transmitted, to the RN 106, a random access preamble using one or more precoders, either in parallel or sequential transmissions. Depending on a random access scheme, e.g. depending on the details of the random access scheme, the wireless device 108 may determine which one of the transmissions of the preamble the RN 106 responded to. Thereby, the wireless device 108 will receive knowledge about at least one reasonably good precoder which will be comprised in the subset.

Additionally or alternatively, the wireless device 108 may determine the subset by determining a first precoder from the set of precoders to be included in the subset, which first precoder gives a received signal quality at the RN 106 that is better than the received signal quality given by the other precoders of the set and by determining a second precoder to be included in the subset, which second precoder is orthogonal to the first precoder. In some embodiments, the second precoder is close to orthogonal or substantially orthogonal to the first precoder. Further, a third precoder may be determined to be orthogonal to the first and second precoders, and a fourth precoder may be determined to be orthogonal to the second and third precoders, etc.

By the expression "orthogonal" when used herein is meant that two precoding vectors $w_1$ and $w_2$ are orthogonal if the inner product $w_1^* w_2 = 0$, wherein $w^*$ (i.e. w with "superscript *") means the complex-conjugate transpose of the vector w. According to some embodiments the expression "orthogonal" is herein also taken to cover "close to orthogonal" and substantially orthogonal, in which cases the inner product between the two precoding vectors may be larger than zero but lower than a threshold value. The inner product may also be referred to as the scalar product between the two precoding vectors.

The signal quality may be a received signal quality at the RN 106. The received signal quality is related to a channel quality at the RN 106. For example, if a known signal is input to a channel, then the received signal quality reflects the channel quality.

In some embodiments, the wireless device 108 determining the subset may further comprise the wireless device 108 determining that a precoder in the set of precoders should be excluded from the subset based on a measurement of an antenna impedance, a reflected antenna power and/or of a physical interaction. In other words, the wireless device 108 may determine the subset by determining a non-useful precoder in the set of precoders based on a measurement of an antenna impedance, a reflected antenna power and/or of a physical interaction. According to some embodiments, the wireless device 108 may utilize a proximity sensor to determine which set of precoders or physical antennas or antenna elements that is not useful due to e.g. a physical interaction such as a blocking hand or other object or body part in physical contact with the wireless device 108. In some embodiments, the wireless device 108 uses measurements of the antenna impedance or reflected power to determine antenna elements that are not useful.

Action 405

In some embodiments, cf. e.g. FIG. 4*c*, the wireless device 108 may receive, from the RN 106, a request for transmission of at least one sounding reference signal by the wireless device 108. The at least one sounding reference signal may in some embodiments comprise more than one sounding reference signals. In other words, the wireless device 108 may receive, from the RN 106, a request for transmission of the sounding reference signal for at least one, or more than one, precoder comprised in the subset.

The wireless device 108 may receive the request in several ways. For example the wireless device 108 may receive the request in a MAC information element, in an RRC message, and/or by L1 and/or L2 signalling, for example explicit L1 signalling, and/or L1/L2 control signalling, etc.

Action 405 relates to Action 603 which will be described below.

Action 406

The wireless device 108 transmits, to the RN 106, at least one sounding reference signal precoded with a respective at least one precoder comprised in the subset, cf. e.g. FIGS. 4*a*-4*c*. This means that each one of the transmitted at least one sounding reference signal is precoded with a respective one of at least one precoder comprised in the subset.

In other words, the wireless device 108 may transmit, to the RN 106, a sounding reference signal for at least one precoder comprised in the subset. The sounding reference signal may be precoded with the at least one precoder by applying the at least one precoder to the transmission of the sounding reference signal on a set of antenna elements of the wireless device 108.

In some embodiments, when for example the wireless device 108 comprises dual-polarised antenna elements, the wireless device 108 may transmit the at least one sounding reference signal by transmitting a first sounding reference signal precoded with a specific precoder out of the respective at least one precoder in a first polarisation, and transmitting a second sounding reference signal precoded with the specific precoder in a second polarisation. Thereby, the RN 106 may determine a phase angle, e.g. in some embodiments an optimal phase angle, of the second polarisation relative to the first polarisation. By the expression "optimal phase angle" is meant a phase angle that minimizes crosstalk between the polarisations. For example, this may be the case when the RN 106 receives beams from two different wireless devices using the same precoder in different polarisations but it may also be the case when the RN 106 receives beams from the same wireless device using the same precoder in different polarisations.

The wireless device 108 may transmit the sounding reference signal by physical layer signalling, i.e. L1 signalling, for example explicit L1 signalling. The at least one sounding reference signal may in some embodiments comprise more than one sounding reference signals, each one of the transmitted more than one sounding reference signals being precoded with a respective one of more than one precoders comprised in the subset.

Action 406 relates to Action 604 which will be described below.

Action 407

As illustrated in FIGS. 4*a* and 4*c*, the wireless device 108 may receive, from the RN 106, a signal indicative of a selected precoder to be used for a transmission to the RN 106, wherein the selected precoder is indirectly selected based on the transmitted at least one sounding reference signal. Alternatively or in addition, as illustrated in FIGS. 4*b* and 30 4*c*, the wireless device 108 may receive, from the RN 106, a scheduling grant for transmitting data, which scheduling grant is based on the transmitted at least one sounding reference signal. The scheduling grant is based on the transmitted at least one sounding reference signal in that the RN 106 upon receiving the at least one sounding reference signal may select one of the at least one sounding reference signal received at the RN 106 and transmit a scheduling grant that is adapted to the reception conditions at the RN 106 for the selected sounding reference signal. As mentioned in Action 406, the transmitted at least one sounding reference signal is precoded with a respective at least one precoder, out of which the RN 106, by selecting one of the at least one sounding reference signal received at the RN 106 indirectly also selects the precoder that was used for precoding the selected sounding reference signal, to be used for the transmission to the RN 106. The transmitted scheduling grant may thereby also be seen to be based on, or adapted to, the selected precoder.

By the expression "scheduling grant is based on a selected precoder" it should be understood that the scheduling grant comprises information relating to the precoder the wireless device 108 should use for transmission to the RN 106.

Further, the expressions "scheduling grant", "scheduling", and "scheduling assignment" may be used interchangeably herein.

For example, the wireless device 108 may receive the signal in a MAC information element, in an RRC message, and/or by L1 and/or L2 signalling, for example explicit L1 signalling, and/or L1/L2 control signalling, etc. The signal indicative of the selected precoder may in some embodiments comprise the scheduling grant. The at least one sounding reference signal may in some embodiments comprise more than one sounding reference signals.

Action 407 relates to Action 606 which will be described below.

Action 408

As illustrated in FIGS. 4b and 4c, the wireless device 108 transmits data to the RN 106 in accordance with the scheduling grant.

Action 408 relates to Action 607 which will be described below.

Action 409

In some embodiments, cf. e.g. FIG. 4c, the wireless device 108 may determine that an update of the subset of precoders is needed or would be beneficial. This may be the case when the wireless device 108 and/or the RN 106 have moved relative to each other or when there is a change in the radio propagation environment. In addition or alternatively, the wireless device 108 may determine that an update of the subset of precoders is needed or would be beneficial when a predefined or predetermined period of time has lapsed. Thus, the subset may be updated at periodical time intervals or at aperiodic time intervals.

In some alternative embodiments, the wireless device 108 may determine that an update of the subset is needed or would be beneficial by receiving an update instruction from the RN 106, which update instruction instructs the wireless device 108 to re-evaluate the subset of precoders, and by re-evaluating the subset in response to receiving the instruction. For example, this may be the case when the RN 106 has determined that the radio conditions has changed, e.g. changed substantially. In such embodiments, when the wireless device 108 has completed the re-evaluation, the wireless device 108 may further transmit a re-evaluation complete message to the RN 106.

For example, the wireless device 108 may receive the update instruction in a MAC information element, in an RRC message, and/or by L1 and/or L2 signalling, for example explicit L1 signalling, and/or L1/L2 control signalling, etc. Further, the wireless device 108 may receive the update instruction in a random access command or a handover command. The random access command may in some embodiments be an initial random access command.

The wireless device 108 may further transmit the re-evaluation complete message in a MAC information element, in an RRC message, and/or by L1 and/or L2 signalling, for example explicit L1 signalling, and/or L1/L2 control signalling, etc.

Action 410

In some embodiments, cf. e.g. FIG. 4c, for example when the wireless device 108 has determined that an update of the subset is needed as described in Action 409 above, the wireless device 108 may transmit an update request for updating the subset of precoders to the RN 106.

The wireless device 108 may transmit the update request to the RN 106 in order to inform the RN 106 that an update of the subset is needed or would be beneficial. Thereby, the RN 106 may prepare for the update of the subset. However, the wireless device 108 may also in some embodiments transmit the update request to the RN 106 in order to receive a permission or instruction from the RN 106 to perform the update of the subset. In some embodiments, the wireless device 108 transmits the update request to the RN 106 so that the RN 106 may transmit a request to the wireless device 108 to send one or more sounding reference signals for one or more precoders comprised in the updated subset of precoders. In some embodiments the RN 106 may transmit a request to the wireless device 108 to send more than one sounding reference signals for more than one precoders comprised in the updated subset of precoders.

The wireless device 108 may also transmit a timing indication in the update request. The timing indication may indicate a point in time when the update of the subset is to be performed or when the update of the subset has been performed.

For example, the wireless device 108 may transmit the update request in a MAC information element, in an RRC message, by L1 and/or L2 signalling, for example explicit L1 signalling, and/or L1/L2 control signalling, etc.

Action 410 relates to Action 608 which will be described below.

Action 411

In some embodiments, cf. e.g. FIG. 4c, the wireless device 108 may receive an update response from the RN 106. The update response may be received in response to the transmitted update request. As will be described in Action 412 below, the wireless device 108 may update the subset of precoders in response to the update response.

The update response may comprise a permission or an instruction to perform the update of the subset. The update response may also comprise a timing indication. The timing indication may indicate a point in time when the update of the subset is to be performed.

For example, the wireless device 108 may receive the update response in a MAC information element, in an RRC message, by L1 and/or L2 signalling, for example explicit L1 signalling, and/or L1/L2 control signalling, etc.

Action 411 relates to Action 609 which will be described below.

Action 412

The wireless device 108 may update the subset of precoders, cf. e.g. FIG. 4c.

In some embodiments, the wireless device 108 updates the subset in response to the determination mentioned in Action 409 above.

In some alternative embodiments, the wireless device 108 updates the subset based on the re-evaluation also mentioned in Action 409 above.

Further, the wireless device 108 may indicate to the RN 106 that the subset has been updated. Furthermore, the wireless device may also indicate to the RN 106 the point in time when the subset was updated. In some embodiments, the wireless device 108 transmits an update complete message to the RN 106 when the subset has been updated. The update complete message may comprise information relating to the point in time when the subset was updated. For example, the wireless device 108 may transmit the update complete message in a MAC information element, in an RRC message, by L1 and/or L2 signalling, for example explicit L1 signalling, and/or L1/L2 control signalling, etc.

Figure 5:
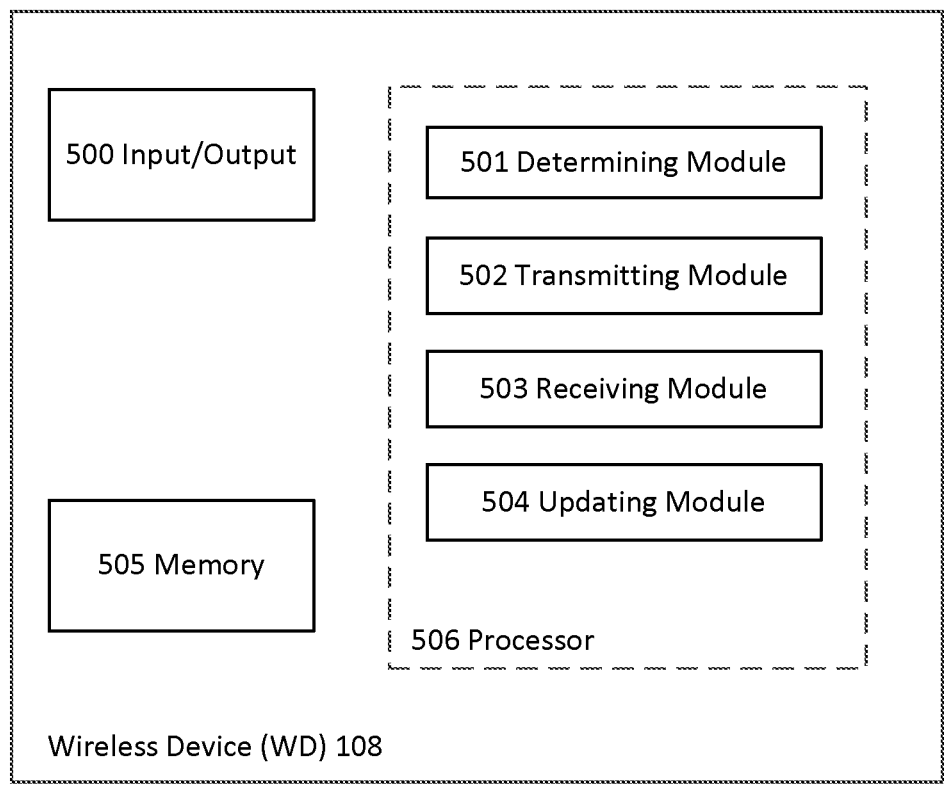
FIG. 5 is a schematic block diagram illustrating embodiments of a wireless device.

To perform the method for assisting in precoder selection for wireless communication with the RN 106, the wireless device 108 may comprise an arrangement depicted in FIG. 5. As previously mentioned, the wireless device 108 is configured with a set of precoders.

Further and in accordance with some embodiments, to perform the method for transmitting data to the RN 106, the wireless device 108 may comprise an arrangement depicted in FIG. 5. As previously mentioned, the wireless device 108 is configured with the set of precoders. Further, each precoder in the set of precoders may be defined to provide a respective transmission pattern when applied to transmission on the set of antenna elements of the wireless device 108.

In some embodiments, the wireless device 108 comprises an input and/or output interface 500 configured to communicate with one or more wireless devices, one or more radio nodes, such as the RN 106, and one or more network nodes.

The input and/or output interface 500 may comprise a wireless receiver (not shown) and a wireless transmitter (not shown).

The wireless device 108 is configured to determine, e.g. by means of a determining module 501 being configured to determine, a subset of precoders out of the set of precoders. The determining module 501 may be implemented by a processor 506 of the wireless device 108. The processor 506 will be described in more detail below.

In some embodiments, the wireless device 108 is further configured to determine, e.g. by means of the determining module 501 being configured to determine, a number of precoders to be comprised in the subset.

The wireless device 108 may further be configured to determine, e.g. by means of the determining module 501 being configured to determine, the subset of precoders based on a measurement on at least one transmission from the RN 106 to the wireless device 108.

In some embodiments, the wireless device 108 is further configured to determine, e.g. by means of the determining module 501 being configured to determine, the subset to comprise at least one precoder, which at least one precoder gives substantially the same transmit radiated energy pattern as the receive sensed energy pattern of a received at least one transmission from the RN 106, i.e. to comprise at least one precoder, which at least one precoder gives a transmit radiated energy pattern that is substantially equal to a receive sensed energy pattern of the received at least one transmission from the RN 106.

The wireless device 108 may further be configured to determine, e.g. by means of the determining module 501 being configured to determine, the subset based on knowledge about at least one preceding subset or based on a random-access procedure.

In some embodiments, the wireless device 108 is further configured to determine, e.g. by means of the determining module 501 being configured to determine, a first precoder from the set of precoders to be included in the subset, which first precoder gives a received signal quality at the RN 106 that is better than the received signal quality given by the other precoders of the set, and to determine a second precoder to be included in the subset, which second precoder is orthogonal to the first precoder.

The wireless device 108 may further be configured to determine, e.g. by means of the determining module 501 being configured to determine, that a precoder in the set of precoders should be excluded from the subset based on a measurement of an antenna impedance, a reflected antenna power and/or of a physical interaction.

In some embodiments, the wireless device 108 is further configured to determine, e.g. by means of the determining module 501 being configured to determine, that an update of the subset of precoders is needed or would be beneficial.

The wireless device 108 is configured to transmit, e.g. by means of a transmitting module 502 being configured to transmit, to the RN 106, at least one sounding reference signal precoded with a respective at least one precoder comprised in the subset. The transmitting module 502 may be implemented by the wireless transmitter or the processor 506 of the wireless device 108.

Further, the wireless device is configured to transmit, e.g. by means of the transmitting module 502 being configured to transmit, data to the RN 106 in accordance with a received scheduling grant.

In some embodiments, wherein the wireless device 108 for example comprises dual polarised antenna elements, the wireless device 108 is configured to transmit, e.g. by means of the transmitting module 502 being configured to transmit, to the RN 106, at least one sounding reference signal comprises further being configured to transmit a first sounding reference signal precoded with a specific precoder out of the respective at least one precoder in a first polarisation, and to transmit a second sounding reference signal precoded with the specific precoder in a second polarisation.

In some embodiments, when the wireless device 108 has determined the number of precoders to be comprised in the subset, the wireless device 108 may further be configured to transmit, e.g. by means of the transmitting module 502 being configured to transmit, to the RN 106, information about the determined number of precoders.

The wireless device 108 may further be configured to transmit, e.g. by means of the transmitting module 502 being configured to transmit, an update request for updating the subset of precoders to the RN 106. The update request may be transmitted in response to the wireless device 108 determining, e.g. by means of the determining module 501 being configured to determine, that an update of the subset of precoders is needed or would be beneficial. The update request may comprise or relate to a request for updating the subset of precoders. Further, the wireless device 108 may be configured to transmit, e.g. by means of the transmitting module 502 being configured to transmit, an indication to the RN 106, which indication indicate that the subset has been updated. The indication may also indicate the point in time for the update of the subset. The wireless device 108 may be configured to transmit, e.g. by means of the transmitting module 502 being configured to transmit, the indication in an update complete message.

As will be described below, the wireless device 108 may re-evaluate the subset of precoders in response to an update instruction from the RN 106. In such embodiments, the wireless device 108 may further be configured to transmit, e.g. by means of the transmitting module 502 being configured to transmit, a re-evaluation complete message to the RN 106.

The wireless device 108 may be configured to receive, e.g. by means of a receiving module 503 being configured to receive, from the RN 106, a signal indicative of a selected precoder to be used for a transmission to the RN 106, wherein the selected precoder is indirectly selected based on the transmitted at least one sounding reference signal. The receiving module 503 may be implemented by the wireless receiver or the processor 506 of the wireless device 108.

Alternatively or in addition, the wireless device 108 may be configured to receive, e.g. by means of the receiving module 503 being configured to receive, from the RN 106, a scheduling grant for transmitting data, which scheduling grant is based on the received at least one sounding reference signal. The received scheduling grant may also be seen to be based on, or adapted to, the selected precoder, because by selecting one of the at least one sounding reference signal received at the RN 106, the RN 106 also indirectly selects the precoder that was used by the wireless device 108 for precoding the sounding reference signal selected to be used by the wireless device 108 for the transmission to the RN 106. The transmission may be a data transmission. The scheduling grant may in some embodiments be comprised in or carried by the signal indicative of the selected precoder.

In some embodiments, the wireless device is further configured to receive, e.g. by means of the receiving module 503 being configured to receive, from the RN 106, a request for transmission of the at least one sounding reference signal by the wireless device 108.

As an alternative to determining the number of precoders to be comprised in the subset by itself, the wireless device 108 may further be configured to receive, e.g. by means of the receiving module 503 being configured to receive, from the RN 106, information about the number of precoders to be comprised in the subset.

In some embodiments, the wireless device 108 is further configured to receive, e.g. by means of the receiving module 503 being configured to receive, at least one transmission from the RN 106, which at least one transmission may be used to determine the subset of precoders as mentioned above in relation to determining module 501.

In some embodiments, the wireless device 108 may further be configured to receive, e.g. by means of the receiving module 503 being configured to receive, an update response from the RN 106. The wireless device 108 may receive the update response in response to the update request transmitted to the RN 106. As previously described, the update response may comprise a permission or an instruction to perform the update of the subset. The update response may also comprise a timing indication. The timing indication may indicate a point in time when the update of the subset is to be performed.

Further, the wireless device 108 may be configured to receive, e.g. by means of the receiving module 503 being configured to receive, an update instruction from the RN 106, which update instruction instructs the wireless device 108 to re-evaluate the subset. In some embodiments, the wireless device 108 is configured to receive the update instruction in a random access command or a handover command. The update instruction may comprise a timing indication. The timing indication may indicate a point in time when the update of the subset is to be performed.

In some embodiments, the wireless device 108 is configured to update, e.g. by means of an updating module 504 being configured to update, the subset of precoders. The updating module 504 may be implemented by the processor 506 of the wireless device 108.

As mentioned above, the wireless device 108 may be configured to determine that an update of the subset of precoders is needed or would be beneficial. Thus, the wireless device 108 may be configured to update, e.g. by means of the updating module 504 being configured to update, the subset in response to the determination. The wireless device 108 may further be configured to update the subset in response to receiving the update response from the RN 106 as mentioned above in relation to the receiving module 503.

In some embodiments, the wireless device 108 may further be configured update, e.g. by means of the updating module 504 being configured to update, the subset of precoders based on a re-evaluation of the subset. As mentioned above, the wireless device 108 may receive an update instruction from the RN 106, which update instruction instructs the wireless device 108 to re-evaluate the subset. Thus, the wireless device 108 may re-evaluate the subset in response to the received update instruction.

The wireless device 108 may also comprise means for storing data. In some embodiments, wireless device 108 comprises a memory 505 configured to store the data. The data may be processed or non-processed data and/or information relating thereto. The memory 505 may comprise one or more memory units. Further, the memory 505 may be a computer data storage or a semiconductor memory such as a computer memory, a read-only memory, a volatile memory or a non-volatile memory. The memory is arranged to be used to store obtained information, data, configurations, schedulings, and applications etc. to perform the methods herein when being executed in the wireless device 108.

Embodiments herein for assisting in precoder selection and/or transmitting data to the RN 106 may be implemented through one or more processors, such as the processor 506 in the arrangement depicted in FIG. 5, together with computer program code for performing the functions and/or method actions of embodiments herein. The program code mentioned above may also be provided as a computer program product, for instance in the form of a data carrier carrying computer program code for performing the embodiments herein when being loaded into the wireless device 108. One such carrier may be in the form of an electronic signal, an optical signal, a radio signal or a computer readable storage medium. The computer readable storage medium may be a CD ROM disc or a memory stick.

The computer program code may furthermore be provided as program code stored on a server and downloaded to the wireless device 108.

Those skilled in the art will also appreciate that the receiving module 503, the transmitting module 502, the determining module 501 and the updating module 504 above may refer to a combination of analog and digital circuits, and/or one or more processors configured with software and/or firmware, e.g. stored in the memory 505, that when executed by the one or more processors such as the processors in the wireless device 108 perform as described above. One or more of these processors, as well as the other digital hardware, may be included in a single Application-Specific Integrated Circuitry (ASIC), or several processors and various digital hardware may be distributed among several separate components, whether individually packaged or assembled into a System-on-a-Chip (SoC).

Methods performed in the RN 106 for performing precoder selection for wireless communication with the wireless device 108, will now be described with reference to flow charts depicted in FIG. 6a-6c. The wireless device 108 is configured with a set of precoders. In some embodiments, the the RN 106 may have knowledge about information relating to the number of precoders comprised in a subset of the set of precoders. Further and in accordance with some embodiments, methods performed in the RN 106 for receiving data from the wireless device 108, will also be described with reference to the flow charts depicted in FIG. 6a-6c. The wireless device 108 may be configured with a set of precoders. Each precoder in the set of precoders is defined to provide a respective transmission pattern when applied to transmission on a set of antenna elements of the wireless device 108. Further, the RN 106 may in some embodiments have knowledge about information relating to the number of precoders comprised in a subset of the set of precoders. For example, the precoders may be numbered to have a consecutive order or the precoders may be assigned respective indices. Thus, the RN 106 may have knowledge about information relating to the number of precoders in the subset or about information relating to the indices assigned to the precoders in the subset.

The methods comprise one or more of the following actions. It should be understood that actions may be taken in any suitable order and that actions may be combined.

Action 601

Figure 6A:
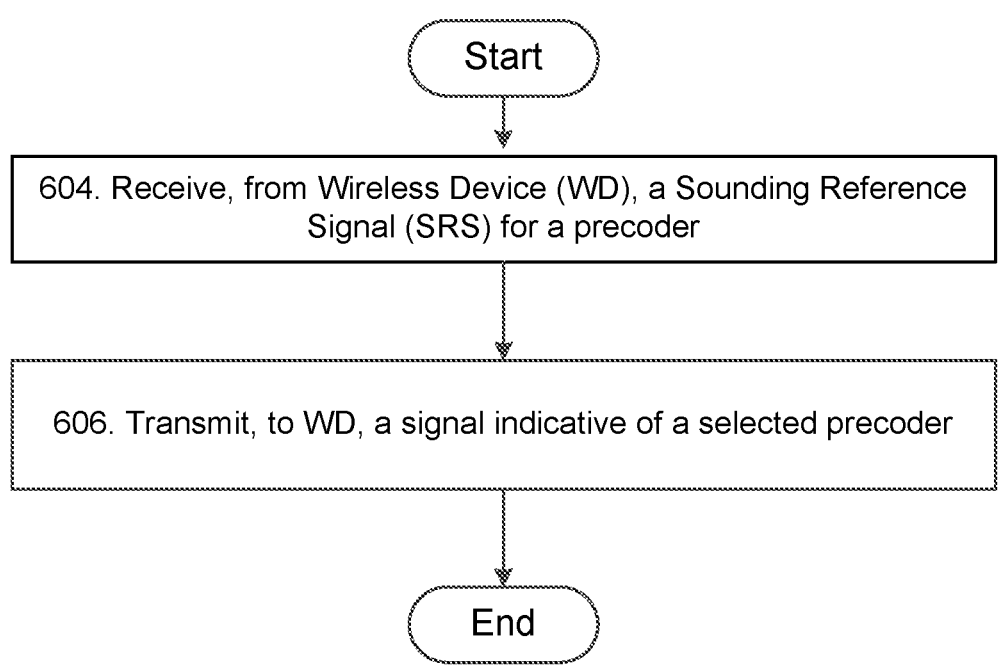
FIG. 6a is a flowchart depicting embodiments of a method in a radio node.
Figure 6B:
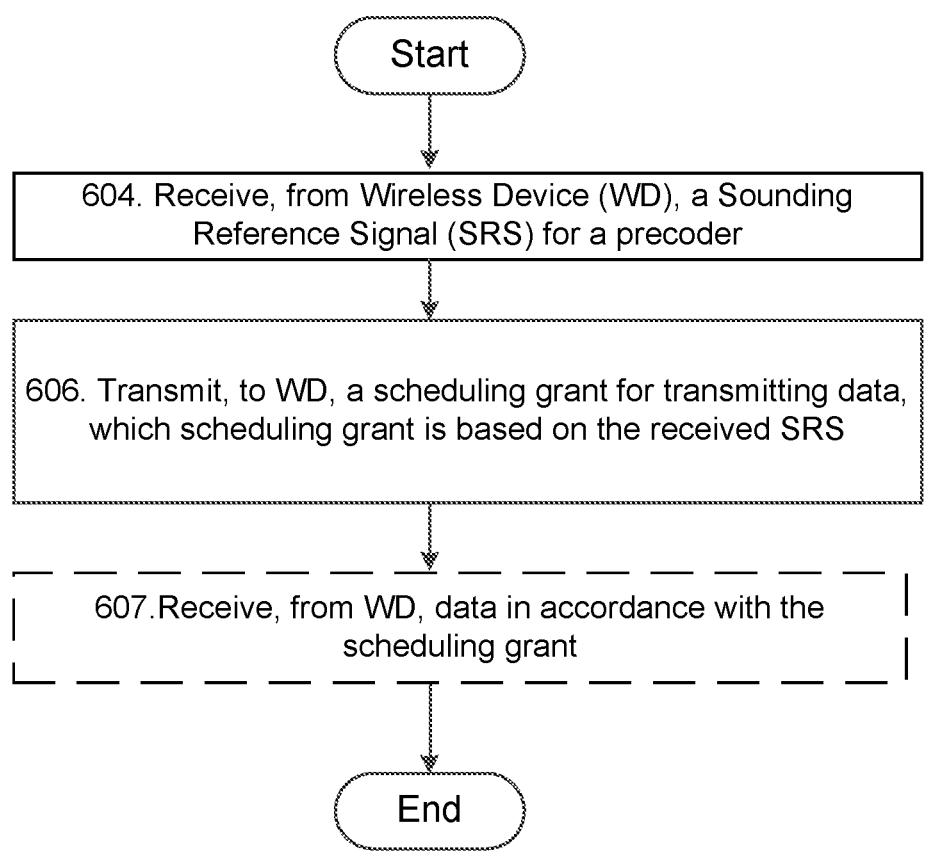
FIG. 6b is a flowchart depicting embodiments of a method in a radio node.
Figure 6C:
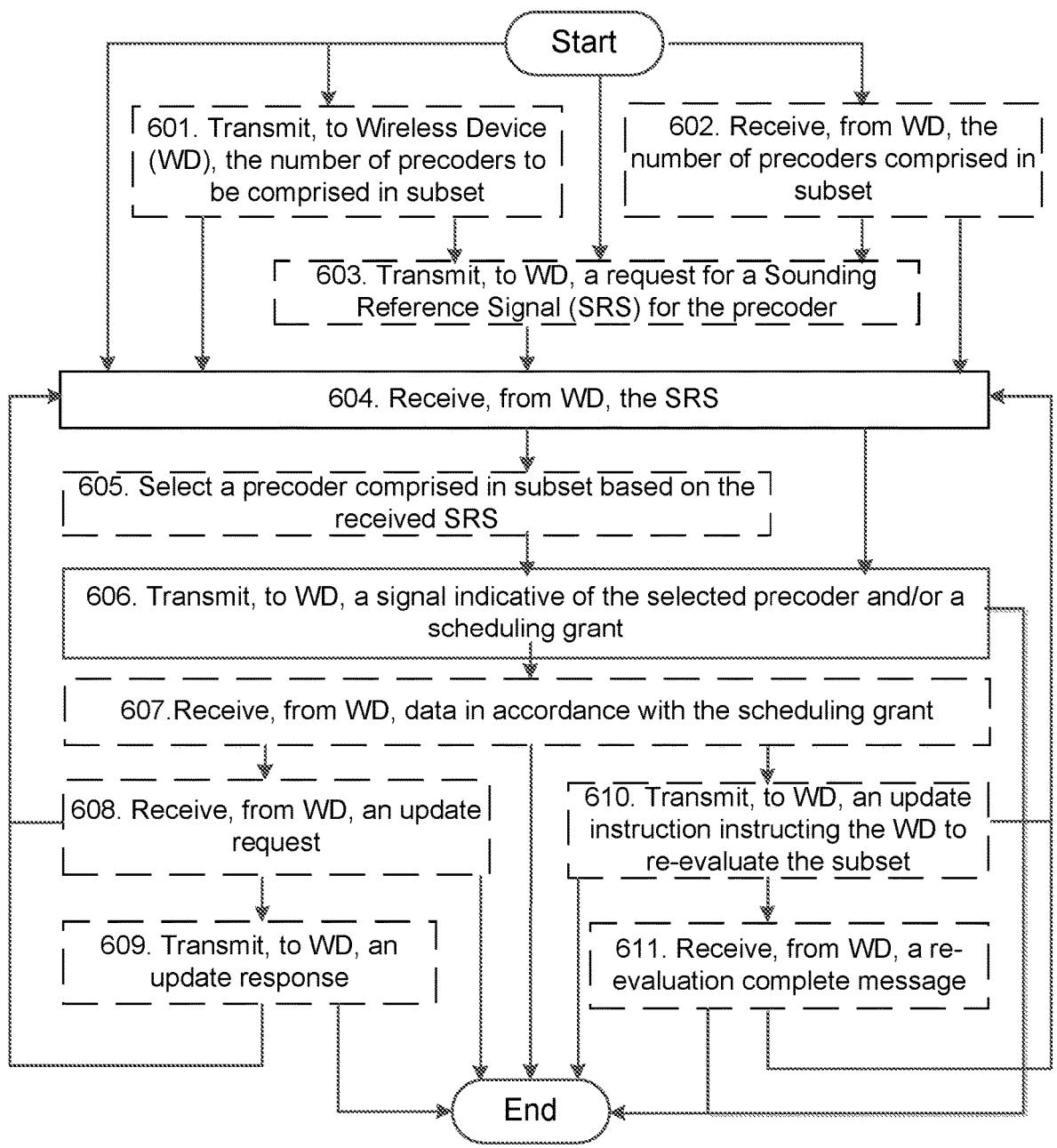
FIG. 6c is a flowchart depicting embodiments of a method in a radio node.

In some embodiments, cf. FIG. 6c, the RN 106 transmits, to the wireless device 108, information about a number of precoders to be comprised in the subset.

Action 601 relates to Action 403 previously described.

Action 602

In some embodiments as an alternative to Action 601, the RN 106 receives, from the wireless device 108, information about a number of precoders comprised in the subset.

Action 602 relates to Action 402 previously described.

Action 603

In some embodiments, cf. FIG. 6c, the RN 106 transmits, to the wireless device 108, a request for transmission, by the wireless device 108, of at least one sounding reference signal The at least one sounding reference signal may in some embodiments comprise more than one sounding reference signals.

Action 603 relates to Action 405 previously described.

Action 604

The RN 106 receives, from the wireless device 108, at least one sounding reference signal precoded with a respective at least one precoder comprised in a subset of precoders out of the set of precoders. This means that each one of the received at least one sounding reference signal is precoded, by the wireless device 108 at transmission of the sounding reference signal, with a respective one of at least one precoder comprised in the subset. The at least one sounding reference signal may in some embodiments comprise more than one sounding reference signals, each one of the received more than one sounding reference signals being precoded, by the wireless device 108 at transmission of the sounding reference signal, with a respective one of more than one precoders comprised in the subset.

In some embodiments, when for example the wireless device 108 comprises dual polarised antenna elements, the RN 106 may receive the at least one sounding reference signal by receiving a first sounding reference signal precoded with a specific precoder out of the respective at least one precoder in a first polarisation and receiving a second sounding reference signal precoded with the specific precoder in a second polarisation. Thereafter, the RN 106 may determine a phase angle of the second polarisation relative to the first polarisation based on the received first and second sounding reference signals.

Action 604 relates to Action 406 previously described.

Action 605

The RN 106 may select a precoder comprised in the subset based on the received at least one sounding reference signal, cf. FIG. 6c.

In some embodiments, the RN 106 indirectly selects the precoder based on the received at least one sounding reference signal.

For example, the received at least one sounding reference signal may be associated with a number or with an index of a respective precoder according to a rule known to the wireless device 108 and the RN 106. Thereby, the RN 106 may select the number or the index of the respective precoder, and by means of the selected number or selected index, the RN 106 indirectly selects the precoder.

The at least one sounding reference signal may in some embodiments comprise more than one sounding reference signals. In such embodiments, the precoder may be indirectly selected based on the received more than one sounding reference signals or based on a selected one of the received more than one sounding reference signals.

Action 606

In some embodiments, cf. e.g. FIGS. 6a and 6c, and in order to inform the wireless device 108 about the precoder to be used for a transmission to the RN 106, the RN 106 transmits, to the wireless device 108, a signal indicative of a selected precoder to be used for the transmission to the RN 106, wherein the selected precoder is indirectly selected based on the received at least one sounding reference signal or based on the received more than one sounding reference signals. The transmission to the RN 106 may be a data transmission.

Alternatively or additionally, cf. e.g. FIGS. 6b and 6c, the RN 106 may transmit, to the wireless device 108, a scheduling grant for transmitting data to the RN 106, which scheduling grant is based on a selected one of the received at least one sounding reference signal or more than one sounding reference signals. The scheduling grant may in some embodiments be comprised in or carried by the signal indicative of the selected precoder. The scheduling grant may be based on the received signal quality of the at least one received sounding reference signal or more than one sounding reference signals.

In some embodiments, when a plurality of sounding reference signals are transmitted to and received by the RN 106, the RN 106 may compare the respective received signal quality of the received sounding reference signals and select one sounding reference signal out of the received sounding reference signals, which selected one sounding reference signal has a received signal quality that is better than the received signal quality of the other received sounding reference signals. In such embodiments, the selected precoder is indirectly selected based on the selected one of the sounding reference signal.

As previously mentioned, the signal quality may be a received signal quality at the RN 106. In some embodiments the received signal quality is referred to as a channel quality at the RN 106.

Action 606 relates to Action 407 previously described.

Action 607

The RN 106 receives data from the wireless device 108 in accordance with the scheduling grant.

Action 607 relates to Action 408 previously described.

Action 608

The RN 106 may receive, from the wireless device 108, an update request for updating the subset of precoders. As previously mentioned, the update request may inform the RN 106 that the update is needed or would be beneficial. Alternatively or in addition, the update request may comprise a request for a permission or an instruction to perform the update.

Action 608 relates to Action 410 previously described.

Action 609

The RN 106 may transmit, to the wireless device 108, an update response. As previously mentioned, the update response may comprise a permission or an instruction to perform the update of the subset. The update response may also comprise a timing indication. The timing indication may indicate a point in time when the update of the subset is to be performed.

Action 609 relates to Action 411 previously described.

Action 610

In some embodiments, the RN 106 transmits, to the wireless device 108, an update instruction instructing the wireless device 108 to re-evaluate the subset. The update instruction may comprise timing information relating to the point in time for the update of the subset.

The RN 106 may transmit the update instruction in a random access command or a handover command. The random access command may in some embodiments be an initial random access command.

Action 610 relates to Action 409 previously described.

Action 611

The RN 106 may receive, from the wireless device 108, a re-evaluation complete message. Further, the RN 106 may receive an update complete message from the wireless device 108 when the updated has been completed. The update complete message may comprise timing information relating to the point in time when the update was performed.

Action 611 relates to Actions 409 and 412 previously described.

Figure 7:
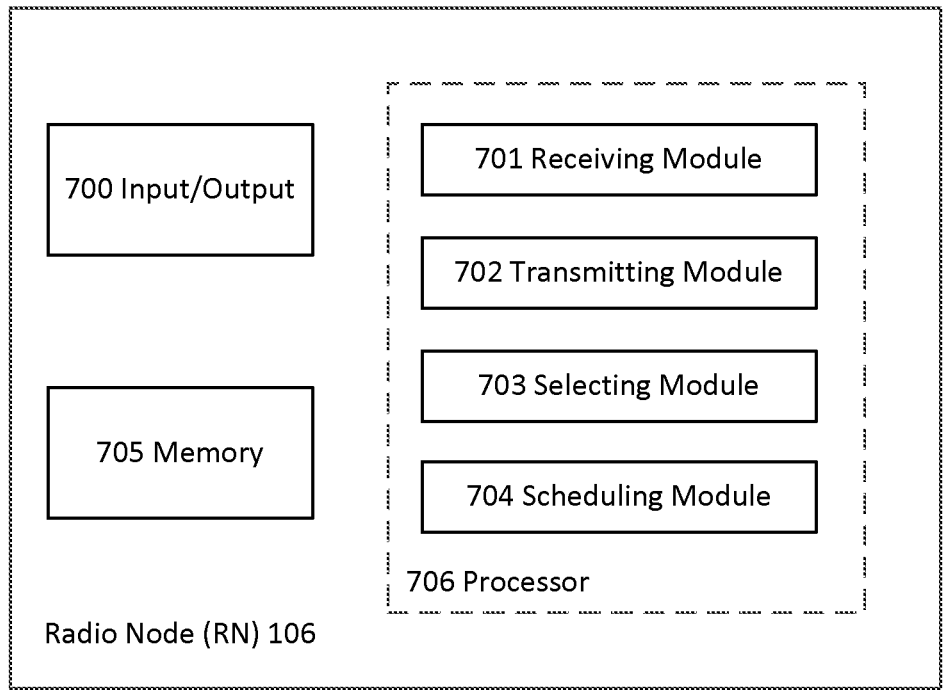
FIG. 7 is a schematic block diagram illustrating embodiments of a radio node.

To perform the method for performing precoder selection for wireless communication with the wireless device 108, the RN 106 may comprise an arrangement depicted in FIG. 7. As previously mentioned, the wireless device 108 is configured with a set of precoders. In some embodiments, the the RN 106 may have knowledge about information relating to the number of precoders comprised in a subset of the set of precoders.

Further and in accordance with some embodiments, to perform the method for receiving data from the wireless device 108, the RN 106 may comprise the arrangement depicted in FIG. 7. The wireless device 108 is configured with a set of precoders. Each precoder in the set of precoders may be defined to provide a respective transmission pattern when applied to transmission on a set of antenna elements of the wireless device 108. Further, the RN 106 may in some embodiments have knowledge about information relating to the number of precoders comprised in a subset of the set of precoders.

In some embodiments, the RN 106 comprises an input and/or output interface 700 configured to communicate with one or more wireless devices, such as the wireless device 108, one or more other radio nodes, and/or one or more other network nodes. The input and/or output interface 700 may comprise a wireless receiver (not shown) and a wireless transmitter (not shown).

The RN 106 may be configured to receive, e.g. by means of a receiving module 701 configured to receive, from the wireless device 108, at least one sounding reference signal precoded with a respective at least one precoder comprised in a subset of precoders out of the set of precoders. The at least one sounding reference signal may in some embodiments comprise more than one sounding reference signals, each one of the received more than one sounding reference signals being precoded, by the wireless device 108 at transmission of the sounding reference signal, with a respective one of more than one precoders comprised in the subset. The receiving module 701 may be implemented by the wireless receiver or a processor 706 of the RN 106. The processor 706 will be described in more detail below.

In some embodiments, the RN 106 may be configured to receive, e.g. by means of the receiving module 701 configured to receive, data from the wireless device 108 in accordance with a scheduling grant.

The RN 106 may further be configured to receive, e.g. by means of the receiving module 701 configured to receive, a first sounding reference signal precoded with a specific precoder out of the respective at least one precoder in a first polarisation, and to receive, e.g. by means of the receiving module 701 configured to receive, a second sounding reference signal precoded with the specific precoder in a second polarisation, and to determine, e.g. by means of a determining module (not shown) configured to determine, a phase angle of the second polarisation relative to the first polarisation based on the received first and second sounding reference signals.

In some embodiments, the RN 106 may further be configured to receive, e.g. by means of the receiving module 701 configured to receive, from the wireless device 108, information about a number of precoders comprised in the subset.

The RN 106 may further be configured to receive, e.g. by means of the receiving module 701 configured to receive, from the wireless device 108, an update request for updating the subset of precoders. The wireless device 108 may transmit the update request to the RN 106 in order to inform the RN 106 that an update of the subset is needed. Thereby, the RN 106 may prepare for the update of the subset. However, alternatively or additionally, the wireless device 108 may transmit the update request to the RN 106 in order to receive a permission or an instruction from the RN 106 to perform the update of the subset. In some embodiments, the wireless device 108 transmits the update request to the RN 106 so that the RN 106 may transmit a request to the wireless device 108 to send one or more sounding reference signals for one or more precoders comprised in the updated subset of precoders. However, it should be understood that the RN 106 may send an update command or instruction to the wireless device at any time, even without a prior update request from the wireless device 108. For example, this may be the case, if the RN 106 has changed something it knows will affect the wireless device 108 and it does not want to wait for the wireless device 108 to discover the change.

In some embodiments, the RN 106 is further configured to receive, e.g. by means of the receiving module 701 configured to receive, from the wireless device 108, a re-evaluation complete message. Thereby, the RN 106 will be informed that the wireless device 108 has completed re-evaluation of the subset.

The RN 106 may be configured to transmit, e.g. by means of a transmitting module 702 configured to transmit, to the wireless device 108, a signal indicative of a selected precoder to be used for a transmission to the RN 106, wherein the selected precoder is indirectly selected based on the received at least one sounding reference signal. The transmission to the RN 106 may be a data transmission. Alternatively or in addition, the RN 106 may be configured to transmit, e.g. by means of the transmitting module 702 configured to transmit, to the wireless device 108, the scheduling grant for transmitting data to the RN 106, which scheduling grant is based on a selected one of the received at least one sounding reference signal. The received scheduling grant may also be seen to be based on, or adapted to, the selected precoder, for reasons explained above e.g. in relation to receiving module 503 of the wireless device 108. The scheduling grant may in some embodiments be comprised in or carried by the signal indicative of the selected precoder. The transmitting module 702 may be the wireless transmitter (not shown) or the processor 706 of the RN 106. As previously mentioned, the selected precoder may be indirectly selected based on the received at least one sounding reference signal.

Further, the scheduling grant may be based on the received signal quality of the received at least one sounding reference signal. As previously mentioned, in some embodiments when a plurality of sounding reference signals are transmitted to and received by the RN 106, the RN 106 may be configured to compare the respective received signal quality of the received sounding reference signals and to select one sounding reference signal out of the received sounding reference signals, which selected sounding reference signal has a received signal quality that is better than the received signal quality of the other received sounding reference signals. In such embodiments, the selected precoder is indirectly selected based on the selected sounding reference signal.

In some embodiments, the RN 106 may further be configured to transmit, e.g. by means of the transmitting module 702 configured to transmit, to the wireless device 108 a request for transmission, by the wireless device 108, of the at least one sounding reference signal The at least one sounding reference signal may in some embodiments comprise more than one sounding reference signals.

The RN 106 may further, in some embodiments, be configured to transmit, e.g. by means of the transmitting module 702 configured to transmit, to the wireless device 108, information about a number of precoders to be comprised in the subset.

In some embodiments, the RN 106 may further be configured to transmit, e.g. by means of the transmitting module 702 configured to transmit, to the wireless device 108, an update response.

Further, the RN 106 may be configured to transmit, e.g. by means of the transmitting module 702 configured to transmit, to the wireless device 108, an update instruction instructing the wireless device 108 to re-evaluate the subset. The RN 106 may be configured to transmit, e.g. by means of the transmitting module 702 configured to transmit, the update instruction in a random access command or a handover command.

The RN 106 may be configured to select, e.g. by means of a selecting module 703 configured to select, a precoder comprised in the subset based on the received at least one sounding reference signal. The selecting module 703 may be implemented by the processor 706 of the RN 106.

In other words, the precoder is indirectly selected based on the received at least one sounding reference signal or based on a selected one of the received at least one sounding reference signal. The at least one sounding reference signal may in some embodiments comprise more than one sounding reference signals. In such embodiments, the precoder may be indirectly selected based on the received more than one sounding reference signals or based on a selected one of the received more than one sounding reference signals.

The RN 106 may be configured to schedule, e.g. by means of a scheduling module 704 configured to schedule, one or more transmissions from the wireless device 108 to the RN 106 based on the indirectly selected precoder. The scheduling module 704 may be implemented by the processor 706 of the RN 106.

The RN 106 may also comprise means for storing data. In some embodiments, the RN 106 comprises a memory 705 configured to store the data. The data may be processed or non-processed data and/or information relating thereto. The memory 705 may comprise one or more memory units. Further, the memory 705 may be a computer data storage or a semiconductor memory such as a computer memory, a read-only memory, a volatile memory or a non-volatile memory. The memory is arranged to be used to store obtained information, data, configurations, schedulings, and applications etc. to perform the methods herein when being executed in the RN 106.

Embodiments herein for performing precoder selection for wireless communication with the wireless device 108 and/or for receiving data from the wireless device 108 may be implemented through one or more processors, such as the processor 706 in the arrangement depicted in FIG. 7, together with computer program code for performing the functions and/or method actions of embodiments herein. The program code mentioned above may also be provided as a computer program product, for instance in the form of a data carrier carrying computer program code for performing the embodiments herein when being loaded into the RN 106. One such carrier may be in the form of an electronic signal, an optical signal, a radio signal or a computer readable storage medium. The computer readable storage medium may be a CD ROM disc or a memory stick.

The computer program code may furthermore be provided as program code stored on a server and downloaded to the RN 106.

Those skilled in the art will also appreciate that the transmitting module 702, the receiving module 701, the selecting module 703, and the scheduling module 704 above may refer to a combination of analog and digital circuits, and/or one or more processors configured with software and/or firmware, e.g. stored in the memory, that when executed by the one or more processors such as the processors in the RN 106 perform as described above. One or more of these processors, as well as the other digital hardware, may be included in a single Application-Specific Integrated Circuitry (ASIC), or several processors and various digital hardware may be distributed among several separate components, whether individually packaged or assembled into a System-on-a-Chip (SoC).

Some Exemplifying Embodiments

According to some exemplifying embodiments, a set M of precoders that is specific for the wireless device 108 is defined and stored in e.g. a memory of the wireless device 108. In other words, each wireless device 108 has its own specific set of precoders which may be stored in a memory of the wireless device 108. In the general case, each precoder defines a complex number for each of the N antenna elements of the wireless device 108. Mathematically, if the wireless device 108 has N antenna elements, a precoder may be represented as the vector, w:

$$w=[w_0 \; w_1 \; \ldots \; w_{N-2} \; w_{N-1}]$$

wherein $w_i$ is a complex number representing the phase and amplitude adjustment of the signal at antenna element i. Note that some antenna elements in this precoding vector may be zero, indicating that the associated antenna element is disabled. The set M of precoders is thus the collection of the available precoders $$M=\{w^{(0)}, \ldots, w^{(\Omega-1)}\}$$

Hence, each precoder w in the set may correspond to a directive beam according to the phase coherent beamforming theory according to background art which may be generalized to arbitrary arrays. Note that a precoder may also be designed to achieve a radiation pattern for which high directivity is not the primary design target. It may be useful if some precoders in the set have approximately omni-directional radiation pattern and different precoders are used to achieve polarization diversity.

A feature of some embodiments herein is that the set M of precoders in the wireless device 108 need not be known to the communications network, e.g. the RN 106. It is thus up to each manufacturer of wireless devices to optimize the set depending on the antenna arrangement of the respective wireless device. Hence, different wireless device in the communications network may have different sets M of precoders stored in a memory. This is useful since the set M of precoders may be optimized for each type of wireless device, whether it is a handset, a laptop, a tablet or a phablet etc.

Different wireless device form factors, such as e.g. cell phone, tablet, laptop, stationary access point etc., imply different antenna placements and thus different sets M of precoders. With the set M of precoders defined for a wireless device, it is observed that the set M of precoders may be much larger than the uplink sounding capacity of the communications network. Hence, the number of precoders of the set M may be in the range of tens to hundreds. It is thus impractical in reality to transmit sounding reference signal for each possible precoding vector in the set M since each sounding occasion consumes uplink bandwidth and power. On the other hand, it is beneficial to have a large set M to cope with many different channel conditions. It is thus a challenge how to deal with the conflicting interests of a large set M of precoders and uplink sounding capacity.

In some embodiments herein, the basic scheme to acquire uplink channel state information at the communications network, e.g. the RN 106, may thus be described in the following actions:

1. A subset S∈M of interesting precoders (e.g. beams) out of the set M of possible precoders (e.g. beams) may be determined in the wireless device 108. Enumeration of the precoders (e.g. beams) in S may be performed in such a way that each precoder (beam) in S has a unique identifier, e.g. by numbering the precoder (e.g. beams) from 0 to |S|−1. This relates to e.g. Actions 301, 302, 304, 401, 402, and 404 described above.
    a. The selected subset S may thus be given by
    $S=\{w^{(k_0)}, \ldots, w^{(k_{X-1})}\}$
    wherein $k_0, \ldots, k_{X-1}$ are the indices of the selected precoding vectors.
2. The RN 106 may request a sounding reference signal of one or more of the beam directions in the subset S in order to assess the channel quality using the different corresponding precoders. However, it should be understood that this action may be optional and that the RN 106 may schedule data transmissions on different precoders (e.g. beams) in the subset S without a preceding sounding reference signal. This relates to e.g. Actions 305, 405 and 603 described above.
3. The RN 106 may schedule data transmission on one or more of the precoders (e.g. beams) in the subset S. A scheduler of the RN 106, e.g. the scheduling module 704, may use the estimated uplink channel quality from action 2 above in the scheduling process, e.g. to determine the transport block size and modulation and coding scheme.

Thus, although the wireless device 108 may be capable of forming up to |M| different beams since this is the total size of the set M of possible precoders, only X=|M| of these precoders may be visible to the RN 106. Especially, the RN 106 does not need to know how the wireless device 108 derived the subset S. Thus, the RN 106 does not need to have knowledge about the antenna arrangement in the wireless device 108. However, the wireless device 108 must use the same enumeration of beams in the subset S in all the actions 1-3 mentioned above. That is, if a certain precoder (beam) in the set M in action 1 above is referred to as precoder (beam) number i, sounding reference signals and uplink scheduling in actions 2 and 3, respectively, must be able to refer to the same precoder (beam) by the index i.

The size |S| of the subset S may either be fixed in the specifications, configurable to the wireless device 108 by the RN 106 using higher layer signaling, such as RRC signaling, or determined by the wireless device 108 itself. In the latter case, the wireless device 108 may need to agree on the size with the RN 106 for example by simply reporting its conclusion to the RN 106. The wireless device 108 may need to agree on the size with the RN 106 so both the wireless device 108 and the RN 106 knows in which range valid precoder indices are when for example requesting sounding. Combinations of the three methods of setting the size ISI of the subset S may also be envisioned.

In some embodiments, the size of the subset S is signaled in the sounding request message to the wireless device 108. Hence, the RN 106 may indicate to the wireless device 108 to transmit X sounding reference signals. Then the wireless device 108 may make the selection of the subset S out of the possible M precoders.

Determining the subset S of transmit precoding weights in action 1 may be done in multiple ways. For example, the wireless device 108 may rely on reciprocity between uplink (UL) and downlink (DL), such as at least long term reciprocity, and measure the downlink quality in all the beams. For example, by finding or determining the receive precoder weights and then finding or determining the transmit precoder weights from the subset S or set M that gives essentially the same radiation pattern, i.e. that gives a transmit radiation pattern that is essentially equal to or corresponding to the receive sensitivity pattern obtained with the determined receive precoder weights, and selecting the ISI best receive ones as members of the transmit precoder subset S. The wireless device 108 may also use prior knowledge of the most promising beam directions from preceding subsets S or a previous random-access step. This relates to e.g. Actions 304 and 404 described above.

The subset S of transmit precoding weights may change over time, e.g. if the wireless device 108 due to e.g. mobility or other changes in the propagation environment has concluded that a different set of beams is of better quality. Hence, the wireless device 108 may need to repeat the determination of the subset according to action 1 above with some periodicity or triggered by some event. Such event may be an internal event in the wireless device 108, e.g. based on measurements, but may also be an external explicit request from the communications network, e.g. the RN 106. This relates to e.g. Actions 312, 409 and 610 described above.

Since the enumeration of the beams in subset S in the three different actions 1-3 above needs to be kept, the wireless device 108 may not update the subset S autonomously. Different possibilities to handle this exist but at least the following two tools may be useful:

The wireless device 108 may, when detecting that updating the subset S is beneficial, transmit an 'update request' to the RN 106. The wireless device 108 may either wait for an 'update' response from the RN 106 before it updates the subset S or the wireless device 108 may update the subset without waiting for a the response. In some embodiments, the former is more preferable than the latter. In the latter case there is a risk that uplink data transmissions not yet effectuated but scheduled by the RN 106 based on the old subset S may fail. This relates to e.g. Actions 312, 313, 316, 409, 410, 411, 412, 608, and 609.

The RN 106 may transmit an update command or instruction to the wireless device 108, which update command may request the wireless device 108 to reevaluate or re-determine the subset S. Either the wireless device 108 may respond with a 'reevaluation complete' response or the forming of a new subset S is assumed to be completed a predefined time from reception of the 'reevaluation request' command. This relates to e.g. Actions 314, 315, 411, 610 and 611 described above.

Other procedures in the wireless device 108 may also imply forming of a new subset S. Examples hereof are random access, e.g. initial random access, and handover commands.

In some embodiments, the selection of the subset S is performed by first finding the best precoding vector from the set M, $w^{(k_0)}$. Then an orthogonal or close to orthogonal vector from this vector $w^{(k_0)}$ is found as a second vector in the subset S, $w^{(k_1)}$. Hence, $$|w^{(k_0)*} w^{(k_1)}| \ll 1$$

assuming these vectors are normalized. This criterion avoids the problem that the wireless device 108 selects two precoding vectors that are nearly parallel, which is likely in an unrestricted algorithm, since if $w^{(k_0)}$ is the best candidate then a near parallel second vector is likely also a good candidate. The algorithm may then continue to find a third candidate which is orthogonal or close to orthogonal to the previous two selected ones and so on. This relates to e.g. Action 404 described above.

Further, in some embodiments, it is assumed that dual polarized antennas are used at the wireless device 108 and that the wireless device 108 transmits one or more sounding reference signals in such way that the RN 106 may determine a desired phase angle, e.g. the optimal phase angle, of a second polarization relative to the first polarization. This may be achieved as follows. For each precoder in the set S, the wireless device 108 uses the precoder twice, one for each polarization, in the sounding reference signal transmission. Hence the RN 106 may then measure the relative phase between the two polarization branches, when this precoder (i.e. beam) is used. It is assumed that the RN 106 knows that the wireless device 108 uses this sounding technique when dual polarized antennas are used at the wireless device 108. This capability may be indicated by the wireless device 108 to the RN 106 using for example RRC configuration and capability signaling. In other words, the wireless device 108 may be configured to indicate this capability to the RN 106 using for example RRC configuration and capability signaling and the RN 106 may be configured to receive sounding reference signals from a wireless device 108 using dual polarized antennas when the wireless device 108 has indicate this capability to the RN 106. When this is the case, the wireless device 108 is scheduled to transmit sounding reference signals for X beams/precoders but the wireless device 108 actually transmits 2X sounding reference signals to achieve the dual polarized channel sounding. This relates to e.g. Action 406 described above.

When using the word "comprise" or "comprising" it shall be interpreted as non-limiting, i.e. meaning "consist at least of". Further, when using the word "a", or "an" herein it should be interpreted as "at least one", "one or more", etc.

The embodiments herein are not limited to the above described preferred embodiments. Various alternatives, modifications and equivalents may be used. Therefore, the above embodiments should not be taken as limiting the scope of the invention, which is defined by the appended claims.

The invention claimed is:

1. A method performed by a wireless device for assisting in precoder selection for wireless communication with a Radio Node (RN), the method comprising:
   determining, in the wireless device, a subset of precoders out of a set of precoders configured in the wireless device and unknown to the RN; and
   transmitting, to the RN, at least one sounding reference signal precoded with a respective at least one precoder comprised in the subset.

2. The method of claim 1, further comprising:
   receiving, from the RN, a signal indicative of a selected precoder to be used for a transmission to the RN, wherein the selected precoder is indirectly selected from the subset of precoders based on the transmitted at least one sounding reference signal.

3. The method of claim 2, wherein the signal indicative of a selected precoder carries a scheduling grant for transmitting data to the RN, which scheduling grant is based on the transmitted at least one sounding reference signal, the method further comprising:
   transmitting data to the RN in accordance with the scheduling grant.

4. The method of claim 1, further comprising:
   receiving, from the RN, a request for transmission of the at least one sounding reference signal by the wireless device.

5. The method of claim 1, wherein transmitting the at least one sounding reference signal comprises:
   transmitting a first sounding reference signal precoded with a specific precoder out of the respective at least one precoder in a first polarization; and
   transmitting a second sounding reference signal precoded with the specific precoder in a second polarization.

6. The method of claim 1, further comprising:
   determining a number of precoders to be comprised in the subset; and
   transmitting, to the RN, information about the determined number of precoders.

7. The method of claim 1, further comprising:
   receiving, from the RN, information about a number of precoders to be comprised in the subset.

8. The method of claim 1, wherein determining the subset further comprises:
   determining the subset of precoders based on a measurement on at least one transmission from the RN to the wireless device.

9. The method of claim 1, wherein determining the subset further comprises:
   receiving at least one transmission from the RN; and
   determining the subset to comprise at least one precoder, which at least one precoder gives substantially the same transmit radiated energy pattern as the receive sensed energy pattern of the received at least one transmission.

10. The method of claim 1, wherein determining the subset further comprises:
    determining the subset based on knowledge about at least one preceding subset or based on a random-access procedure.

11. The method of claim 1, wherein determining the subset further comprises:
    determining a first precoder from the set of precoders to be included in the subset, which first precoder gives a received signal quality at the RN that is better than the received signal quality given by the other precoders of the set; and
    determining a second precoder to be included in the subset, which second precoder is orthogonal to the first precoder.

12. The method of claim 1, wherein determining the subset further comprises:
    determining that a precoder in the set of precoders should be excluded from the subset based on a measurement of an antenna impedance, a reflected antenna power and/or of a physical interaction.

13. The method of claim 1, further comprising:
   determining that an update of the subset of precoders is needed; and
   updating the subset in response to the determination.

14. The method of claim 13, wherein updating the subset further comprises:
   transmitting an update request for updating the subset of precoders to the RN in response to the wireless device determining that an update of the subset of precoders is needed.

15. The method of claim 14, wherein updating the subset further comprises:
   receiving an update response from the RN, wherein the updating of the subset is performed by the wireless device in response to receiving the update response from the RN.

16. The method of claim 13, wherein determining that an update of the subset is needed further comprises:
   receiving an update instruction from the RN instructing the wireless device to re-evaluate the subset of precoders;
   re-evaluating the subset; and wherein the updating the subset further comprises:
   up-dating the subset based on the re-evaluation.

17. The method of claim 16, wherein determining that an update of the subset is needed further comprises:
   transmitting a re-evaluation complete message to the RN.

18. The method of claim 16, wherein the update instruction is received in a random access command or a handover command.

19. A method performed by a Radio Node (RN) for performing precoder selection for wireless communication with a wireless device, the method comprising:
   receiving, from the wireless device, at least one sounding reference signal precoded with a respective at least one precoder comprised in a subset of precoders out of a set of precoders configured in the wireless device and unknown to the RN; and
   transmitting, to the wireless device, a signal indicative of a selected precoder to be used for a transmission to the RN, wherein the selected precoder is indirectly selected from the subset of precoders based on the received at least one sounding reference signal.

20. The method of claim 19, wherein the signal indicative of the selected precoder carries a scheduling grant for transmitting data to the RN, which scheduling grant is based on a selected one of the received at least one sounding reference signal, the method comprising:
   receiving data from the wireless device in accordance with the scheduling grant.

21. The method of claim 19, further comprising:
   transmitting, to the wireless device a request for transmission, by the wireless device, of the at least one sounding reference signal.

22. The method of claim 19, wherein receiving the at least one sounding reference signal comprises:
   receiving a first sounding reference signal precoded with a specific precoder out of the respective at least one precoder in a first polarization;
   receiving a second sounding reference signal precoded with the specific precoder in a second polarization; and
   determining a phase angle of the second polarization relative to the first polarization based on the received first and second sounding reference signals.

23. The method of claim 19, wherein the scheduling grant is based on the received signal quality of the received at least one sounding reference signal.

24. The method of claim 19, further comprising:
   receiving, from the wireless device, information about a number of precoders comprised in the subset.

25. The method of claim 19, further comprising:
   transmitting, to the wireless device, information about a number of precoders to be comprised in the subset.

26. The method of claim 19, further comprising:
   receiving, from the wireless device, an update request for updating the subset of precoders.

27. The method of claim 26, further comprising:
   transmitting, to the wireless device, an update response in response to the update request.

28. The method of claim 19, further comprising:
   transmitting, to the wireless device, an update instruction instructing the wireless device to re-evaluate the subset.

29. The method of claim 28, further comprising:
   receiving, from the wireless device, a re-evaluation complete message.

30. The method of claim 28, wherein the update instruction is transmitted in a random access command or a handover command.

31. A wireless device for assisting in precoder selection for wireless communication with a Radio Node (RN), the wireless device being configured to:
   determine a subset of precoders out of a set of precoders configured in the wireless device and unknown to the RN; and
   transmit, to the RN, at least one sounding reference signal precoded with a respective at least one precoder comprised in the subset.

32. The wireless device of claim 31, the wireless device further being configured to:
   receive, from the RN, a signal indicative of a selected precoder to be used for a transmission to the RN, wherein the selected precoder is indirectly selected from the subset of precoders based on the transmitted at least one sounding reference signal.

33. The wireless device of claim 32, the wireless device being configured to:
   receive, from the RN, the signal indicative of a selected precoder carrying a scheduling grant for transmitting data to the RN, which scheduling grant is based on the transmitted at least one sounding reference signal; and
   transmit data to the RN in accordance with the scheduling grant.

34. The wireless device of claim 31, the wireless device further being configured to:
   receive, from the RN, a request for transmission of the at least one sounding reference signal by the wireless device.

35. The wireless device of claim 31, wherein the wireless device being configured to transmit, to the RN, at least one sounding reference signal comprises the wireless device being further configured to:
   transmit a first sounding reference signal precoded with a specific precoder out of the respective at least one precoder in a first polarization; and
   transmit a second sounding reference signal precoded with the specific precoder in a second polarization.

36. The wireless device of claim 31, the wireless device further configured to:
   determine a number of precoders to be comprised in the subset; and
   transmit, to the RN, information about the determined number of precoders.

37. The wireless device of claim 31, the wireless device further configured to:

receive, from the RN, information about a number of precoders to be comprised in the subset.

38. The wireless device of claim 31, wherein the wireless device being configured to determine a subset of precoders comprises the wireless device being further configured to:
   determine the subset of precoders based on a measurement on at least one transmission from the RN to the wireless device.

39. The wireless device of claim 31, wherein the wireless device being configured to determine a subset of precoders comprises the wireless device being further configured to:
   receive at least one transmission from the RN; and
   determine the subset to comprise at least one precoder, which at least one precoder gives substantially the same transmit radiated energy pattern as the receive sensed energy pattern of the received at least one transmission.

40. The wireless device of claim 31, wherein the wireless device being configured to determine a subset of precoders comprises the wireless device being further configured to:
   determine the subset based on knowledge about at least one preceding subset or based on a random-access procedure.

41. The wireless device of claim 31, wherein the wireless device being configured to determine a subset of precoders comprises the wireless device being further configured to:
   determine a first precoder from the set of precoders to be included in the subset, which first precoder gives a received signal quality at the RN that is better than the received signal quality given by the other precoders of the set; and
   determine a second precoder to be included in the subset, which second precoder is orthogonal to the first precoder.

42. The wireless device of claim 31, wherein the wireless device being configured to determine a subset of precoders comprises the wireless device being further configured to:
   determine that a precoder in the set of precoders should be excluded from the subset based on a measurement of an antenna impedance, a reflected antenna power and/or of a physical interaction.

43. The wireless device of claim 31, the wireless device further configured to:
   determine that an update of the subset of precoders is needed; and
   update the subset in response to the determination.

44. The wireless device of claim 43, wherein the wireless device being configured to update the subset comprises the wireless device being further configured to:
   transmit an update request for updating the subset of precoders to the RN in response to the wireless device determining that an update of the subset of precoders is needed.

45. The wireless device of claim 44, wherein the wireless device being configured to update the subset comprises the wireless device being further configured to:
   receive an update response from the RN, wherein the subset is updated by the wireless device in response to receiving the update response from the RN.

46. The wireless device of claim 43, wherein the wireless device being configured to determine that an update of the subset is needed comprises the wireless device being further configured to:
   receive an update instruction from the RN instructing the wireless device to re-evaluate the subset;
   re-evaluate the subset; and being configured to update the subset by being further configured to:
   up-date the subset based on the re-evaluation.

47. The wireless device of claim 46, wherein the wireless device being configured to determine that an update of the subset is needed comprises the wireless device being further configured to:
   transmit a re-evaluation complete message to the RN.

48. The wireless device of claim 46, the wireless device being further configured to receive the update instruction in a random access command or a handover command.

49. A Radio Node (RN) for performing precoder selection for wireless communication with a wireless device, the RN being configured to:
   receive, from the wireless device, at least one sounding reference signal precoded with a respective at least one precoder comprised in a subset of precoders out of a set of precoders configured in the wireless device and unknown to the RN; and
   transmit, to the wireless device, a signal indicative of a selected precoder to be used for a transmission to the RN, wherein the selected precoder is indirectly selected from the subset of precoders based on the received at least one sounding reference signal.

50. The RN of claim 49, the RN being configured to:
   transmit, to the wireless device, the signal indicative of the selected precoder carrying a scheduling grant for transmitting data to the RN, which scheduling grant is based on a selected one of the received at least one sounding reference signal; and
   receive data from the wireless device in accordance with the scheduling grant.

51. The RN of claim 49, the RN being further configured to:
   transmit, to the wireless device, a request for transmission, by the wireless device, of the at least one sounding reference signal.

52. The RN of claim 49, the RN being configured to receive the at least one sounding reference signal by being further configured to:
   receive a first sounding reference signal precoded with a specific precoder out of the respective at least one precoder in a first polarization;
   receive a second sounding reference signal precoded with the specific precoder in a second polarization; and
   determine a phase angle of the second polarization relative to the first polarization based on the received first and second sounding reference signals.

53. The RN of claim 50, wherein the scheduling grant is based on the received signal quality of the received at least one sounding reference signal.

54. The RN of claim 49, the RN being further configured to:
   receive, from the wireless device, information about a number of precoders comprised in the subset.

55. The RN of claim 49, the RN being further configured to:
   transmit, to the wireless device, information about a number of precoders to be comprised in the subset.

56. The RN of claim 49, the RN being further configured to:
   receive, from the wireless device, an update request for updating the subset of precoders.

57. The RN of claim 56, the RN being further configured to:
   transmit, to the wireless device, an update response.

58. The RN of claim 49, the RN being further configured to:
   transmit, to the wireless device, an update instruction instructing the wireless device to re-evaluate the subset.

59. The RN of claim 58, the RN being further configured to:
  receive, from the wireless device, a re-evaluation complete message.

60. The RN of claim 58, the RN being further configured to transmit the update instruction in a random access command or a handover command.

\* \* \* \* \*

UNITED STATES PATENT AND TRADEMARK OFFICE
CERTIFICATE OF CORRECTION

| | |
|---|---|
| PATENT NO. | : 11,196,465 B2 |
| APPLICATION NO. | : 15/315330 |
| DATED | : December 7, 2021 |
| INVENTOR(S) | : Parkvall et al. |

It is certified that error appears in the above-identified patent and that said Letters Patent is hereby corrected as shown below:

In the Specification

In Column 2, Line 19, delete "d~N2." and insert -- d≈N2. --, therefor.

In Column 2, Line 61, delete "20 network." and insert -- network. --, therefor.

In Column 3, Line 8, delete "compromise 30" and insert -- compromise --, therefor.

In Column 3, Line 33, delete "wireless 15" and insert -- wireless --, therefor.

In Column 14, Line 30, delete "and 30 4c," and insert -- and 4c, --, therefor.

In Column 15, Line 17, delete "periodical time" and insert -- periodic time --, therefor.

In Column 27, Line 46, delete "X=|M|" and insert -- X=|S| --, therefor.

In Column 28, Line 1, delete "ISI" and insert -- |S| --, therefor.

In Column 28, Line 20, delete "ISI" and insert -- |S| --, therefor.

In the Claims

In Column 31, Line 65, in Claim 23, delete "claim 19, wherein" and insert -- claim 20, wherein --, therefor.

Signed and Sealed this
Thirty-first Day of May, 2022

Katherine Kelly Vidal
*Director of the United States Patent and Trademark Office*